US012608087B2

(12) United States Patent
Cho et al.

(10) Patent No.: US 12,608,087 B2
(45) Date of Patent: *Apr. 21, 2026

(54) SCISSOR HAND GESTURE FOR A COLLABORATIVE OBJECT

(71) Applicant: Snap Inc., Santa Monica, CA (US)

(72) Inventors: Youjean Cho, New York, NY (US); Chen Ji, New York, NY (US); Fannie Liu, New York, NY (US); Andrés Monroy-Hernández, Seattle, WA (US); Tsung-Yu Tsai, Issaquah, WA (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,095

(22) Filed: Jul. 31, 2024

(65) Prior Publication Data

US 2024/0393885 A1    Nov. 28, 2024

Related U.S. Application Data

(63) Continuation of application No. 17/900,812, filed on Aug. 31, 2022, now Pat. No. 12,079,395.

(51) Int. Cl.
*G06F 3/01* (2006.01)
*G06T 7/11* (2017.01)
(Continued)

(52) U.S. Cl.
CPC ................ *G06F 3/017* (2013.01); *G06T 7/11* (2017.01); *G06T 7/20* (2013.01); *G06V 40/28* (2022.01);
(Continued)

(58) Field of Classification Search
CPC . G06F 3/017; G06F 3/011; G06T 7/11; G06T 7/20; G06T 2207/20132;
(Continued)

(56) References Cited

U.S. PATENT DOCUMENTS 6,275,863 B1    8/2001  Leff et al.
6,535,909 B1    3/2003  Rust
(Continued)

FOREIGN PATENT DOCUMENTS

JP        H08287016 A    11/1996
JP        2019160282 A    9/2019
(Continued)

OTHER PUBLICATIONS

International Search Report and Written Opinion received in Patent Cooperation Treaty Application No. PCT/US2023/028377, dated Nov. 6, 2023.
(Continued)

*Primary Examiner* — Grant Sitta
(74) *Attorney, Agent, or Firm* — CM Law; Stephen J. Weed

(57) ABSTRACT

Collaborative sessions in which access to a collaborative object and added virtual content is selectively provided to participants/users. In one example of the collaborative session, a participant crops media content by use of a hand gesture to produce an image segment that can be associated to the collaborative object. The hand gesture resembles a pair of scissors and the camera and processor of the client device track a path of the hand gesture to identify an object within a displayed image to create virtual content of the identified object. The virtual content created by the hand gesture is then associated to the collaborative object.

13 Claims, 17 Drawing Sheets

(51) Int. Cl.
  *G06T 7/20* (2017.01)
  *G06V 40/20* (2022.01)

(52) U.S. Cl.
  CPC .............. *G06T 2207/20132* (2013.01); *G06T 2207/30196* (2013.01)

(58) Field of Classification Search
  CPC ........ G06T 2207/30196; G06T 19/006; G06V 40/28; G06V 10/235; G06V 10/94; G06V 10/17; G06V 10/82; G06V 20/20
  See application file for complete search history.

(56) References Cited

U.S. PATENT DOCUMENTS

| | | | |
|---|---|---|---|
| 7,216,305 B1 | 5/2007 | Jaeger | |
| 7,360,164 B2 | 4/2008 | Bjoernsen et al. | |
| 8,468,129 B2 | 6/2013 | Ho et al. | |
| 8,558,759 B1 | 10/2013 | Prada Gomez et al. | |
| 8,615,108 B1* | 12/2013 | Stoppa | G06V 10/462 |
| | | | 382/199 |
| 8,713,106 B2 | 4/2014 | Spataro et al. | |
| 8,752,138 B1 | 6/2014 | Bennett et al. | |
| 8,788,680 B1 | 7/2014 | Naik | |
| 9,076,033 B1* | 7/2015 | Barron | G06F 3/005 |
| 9,137,220 B2 | 9/2015 | Crosbie et al. | |
| 9,280,553 B2 | 3/2016 | Saliba et al. | |
| 9,398,059 B2 | 7/2016 | Shepherd et al. | |
| 9,417,754 B2 | 8/2016 | Smith | |
| 9,418,479 B1 | 8/2016 | Worley, III et al. | |
| 9,536,354 B2 | 1/2017 | Starner et al. | |
| 9,607,438 B2 | 3/2017 | Blanchflower et al. | |
| 9,667,676 B1 | 5/2017 | Lo et al. | |
| 9,824,335 B1 | 11/2017 | Vander Mey | |
| 9,983,759 B1 | 5/2018 | Dhawan et al. | |
| 10,289,817 B2 | 5/2019 | Ristock et al. | |
| 10,552,801 B2 | 2/2020 | Gatzke et al. | |
| 10,574,442 B2 | 2/2020 | Amiri et al. | |
| 10,884,502 B2 | 1/2021 | Dobson | |
| 10,956,868 B1 | 3/2021 | Cronan | |
| 10,963,066 B2 | 3/2021 | Lee et al. | |
| 10,986,301 B1* | 4/2021 | Schanz | H04S 7/303 |
| 11,012,720 B1 | 5/2021 | Chundi et al. | |
| 11,178,376 B1 | 11/2021 | Tichenor et al. | |
| 11,275,850 B1 | 3/2022 | Brandwine et al. | |
| 11,288,711 B1 | 3/2022 | McIntosh et al. | |
| 11,450,034 B2 | 9/2022 | Lebeck et al. | |
| 11,562,657 B1 | 1/2023 | Fieldman | |
| 11,604,898 B2 | 3/2023 | Camery | |
| 11,630,633 B1 | 4/2023 | Macdougall | |
| 11,636,655 B2 | 4/2023 | Ma et al. | |
| 11,677,908 B2 | 6/2023 | Zhang | |
| 11,695,808 B2 | 7/2023 | Johnston et al. | |
| 11,704,652 B2 | 7/2023 | Ene et al. | |
| 11,734,886 B1 | 8/2023 | Bhushan et al. | |
| 12,019,773 B2 | 6/2024 | Cho et al. | |
| 12,079,395 B2* | 9/2024 | Cho | G06V 10/17 |
| 12,189,823 B1 | 1/2025 | Camery | |
| 12,348,499 B2 | 7/2025 | Mustafi et al. | |
| 12,380,406 B1 | 8/2025 | Pearson et al. | |
| 2003/0105734 A1 | 6/2003 | Hitchen et al. | |
| 2003/0197729 A1 | 10/2003 | Denoue et al. | |
| 2006/0047814 A1 | 3/2006 | Batz et al. | |
| 2006/0080432 A1 | 4/2006 | Spataro et al. | |
| 2007/0033419 A1 | 2/2007 | Kocher et al. | |
| 2008/0013793 A1 | 1/2008 | Hillis et al. | |
| 2008/0036732 A1 | 2/2008 | Wilson et al. | |
| 2009/0178073 A1 | 7/2009 | Tsuria et al. | |
| 2010/0235763 A1 | 9/2010 | Massand | |
| 2010/0257457 A1 | 10/2010 | De Goes | |
| 2011/0202599 A1 | 8/2011 | Yuan et al. | |
| 2012/0260347 A1 | 10/2012 | Whitfield, Jr. et al. | |
| 2012/0293544 A1 | 11/2012 | Miyamoto et al. | |
| 2013/0028400 A1* | 1/2013 | Fix | G09B 5/12 |
| | | | 379/88.13 |

| | | | |
|---|---|---|---|
| 2013/0120365 A1 | 5/2013 | Lee et al. | |
| 2013/0127980 A1 | 5/2013 | Haddick et al. | |
| 2013/0219458 A1 | 8/2013 | Ramanathan | |
| 2013/0293468 A1 | 11/2013 | Perez et al. | |
| 2014/0280498 A1 | 9/2014 | Frankel et al. | |
| 2015/0020151 A1 | 1/2015 | Ramanathan | |
| 2015/0035823 A1 | 2/2015 | Arsan et al. | |
| 2015/0113571 A1 | 4/2015 | Cholas et al. | |
| 2015/0135332 A1 | 5/2015 | Follis et al. | |
| 2015/0235447 A1 | 8/2015 | Abovitz et al. | |
| 2015/0264338 A1 | 9/2015 | Ueno et al. | |
| 2015/0288933 A1* | 10/2015 | Iversen | G06T 7/174 |
| | | | 348/14.07 |
| 2016/0026253 A1 | 1/2016 | Bradski et al. | |
| 2016/0044073 A1 | 2/2016 | Rosenberg | |
| 2016/0086383 A1* | 3/2016 | Starner | G06T 7/12 |
| | | | 345/633 |
| 2016/0091976 A1 | 3/2016 | Kumar et al. | |
| 2016/0306816 A1 | 10/2016 | Morales, Jr. | |
| 2016/0337291 A1 | 11/2016 | Park et al. | |
| 2017/0054756 A1 | 2/2017 | Jones et al. | |
| 2017/0060888 A1 | 3/2017 | Al Hassanat et al. | |
| 2017/0118271 A1 | 4/2017 | Reyes | |
| 2017/0132568 A1* | 5/2017 | Glunz | H04L 67/10 |
| 2017/0186064 A1 | 6/2017 | Kaptsan et al. | |
| 2018/0005442 A1 | 1/2018 | Mullins | |
| 2018/0012032 A1 | 1/2018 | Radich et al. | |
| 2018/0075657 A1 | 3/2018 | Lanier et al. | |
| 2018/0077099 A1 | 3/2018 | Silva et al. | |
| 2018/0095635 A1 | 4/2018 | Valdivia et al. | |
| 2018/0095636 A1 | 4/2018 | Valdivia et al. | |
| 2018/0096507 A1 | 4/2018 | Valdivia et al. | |
| 2018/0158243 A1 | 6/2018 | Gleason et al. | |
| 2018/0183810 A1 | 6/2018 | Jones et al. | |
| 2018/0267940 A1 | 9/2018 | Lee et al. | |
| 2018/0286127 A1 | 10/2018 | Evertt et al. | |
| 2018/0337929 A1 | 11/2018 | Kurian | |
| 2018/0350144 A1 | 12/2018 | Rathod | |
| 2019/0019011 A1 | 1/2019 | Ross et al. | |
| 2019/0019348 A1 | 1/2019 | Yamamoto et al. | |
| 2019/0028605 A1 | 1/2019 | Kee et al. | |
| 2019/0043264 A1 | 2/2019 | Tomizuka et al. | |
| 2019/0099653 A1 | 4/2019 | Wanke et al. | |
| 2019/0108239 A1 | 4/2019 | Yang et al. | |
| 2019/0108578 A1 | 4/2019 | Spivack et al. | |
| 2019/0130656 A1 | 5/2019 | Gebbie et al. | |
| 2019/0220177 A1 | 7/2019 | Guido et al. | |
| 2019/0325012 A1 | 10/2019 | Delaney et al. | |
| 2019/0355181 A1 | 11/2019 | Srinivasan et al. | |
| 2019/0362562 A1 | 11/2019 | Benson | |
| 2020/0074060 A1 | 3/2020 | Oh | |
| 2020/0076748 A1 | 3/2020 | Han et al. | |
| 2020/0104522 A1 | 4/2020 | Collart | |
| 2020/0117705 A1 | 4/2020 | Hance et al. | |
| 2020/0184217 A1 | 6/2020 | Faulkner et al. | |
| 2020/0193206 A1 | 6/2020 | Turkelson et al. | |
| 2020/0201450 A1 | 6/2020 | Schwartz et al. | |
| 2020/0357184 A1 | 11/2020 | Paul et al. | |
| 2020/0374146 A1 | 11/2020 | Chhabra et al. | |
| 2021/0004491 A1 | 1/2021 | Saha et al. | |
| 2021/0011545 A1 | 1/2021 | Min | |
| 2021/0019944 A1 | 1/2021 | McKeever | |
| 2021/0046383 A1 | 2/2021 | Dhaliwal et al. | |
| 2021/0048972 A1 | 2/2021 | Cardenuto et al. | |
| 2021/0081036 A1 | 3/2021 | Johnston et al. | |
| 2021/0097719 A1* | 4/2021 | Kulbida | G06T 7/33 |
| 2021/0216705 A1 | 7/2021 | Handy Bosma et al. | |
| 2021/0240372 A1 | 8/2021 | Loh et al. | |
| 2021/0241529 A1 | 8/2021 | Cowburn et al. | |
| 2021/0264222 A1 | 8/2021 | Pelov | |
| 2021/0286502 A1 | 9/2021 | Lemay et al. | |
| 2021/0294560 A1 | 9/2021 | Vembar et al. | |
| 2021/0306386 A1 | 9/2021 | Smith et al. | |
| 2021/0405955 A1 | 12/2021 | Canberk et al. | |
| 2022/0026920 A1 | 1/2022 | Ebrahimi Afrouzi et al. | |
| 2022/0062763 A1 | 3/2022 | Wong | |
| 2022/0084235 A1 | 3/2022 | Bar-Zeev et al. | |
| 2022/0086238 A1 | 3/2022 | Oh et al. | |
| 2022/0091722 A1 | 3/2022 | Faulkner et al. | |

(56) References Cited

U.S. PATENT DOCUMENTS

| | | | |
|---|---|---|---|
| 2022/0129082 A1 | 4/2022 | Schoen | |
| 2022/0137701 A1 | 5/2022 | Bowman et al. | |
| 2022/0139056 A1 | 5/2022 | Fieldman | |
| 2022/0198765 A1 | 6/2022 | Nickerson et al. | |
| 2022/0206588 A1 | 6/2022 | Canberk et al. | |
| 2022/0222900 A1 | 7/2022 | Tomizuka et al. | |
| 2022/0231847 A1 | 7/2022 | Rangarajan et al. | |
| 2022/0317776 A1 | 10/2022 | Sundstrom et al. | |
| 2022/0317830 A1 | 10/2022 | Skuratowicz et al. | |
| 2022/0405955 A1 | 12/2022 | Ohishi et al. | |
| 2023/0041862 A1 | 2/2023 | Gao et al. | |
| 2023/0083688 A1 | 3/2023 | Janakiraman et al. | |
| 2023/0141680 A1 | 5/2023 | Asgekar et al. | |
| 2023/0145605 A1 | 5/2023 | Shah et al. | |
| 2023/0176805 A1 | 6/2023 | Dudovitch et al. | |
| 2023/0244802 A1 | 8/2023 | Paul et al. | |
| 2023/0258463 A1 | 8/2023 | Nussbaum et al. | |
| 2024/0007594 A1* | 1/2024 | Jeon | H04N 7/157 |
| 2024/0069643 A1 | 2/2024 | Cho et al. | |
| 2024/0070243 A1 | 2/2024 | Cho et al. | |
| 2024/0070298 A1 | 2/2024 | Cho et al. | |
| 2024/0070299 A1 | 2/2024 | Cho et al. | |
| 2024/0070300 A1 | 2/2024 | Cho et al. | |
| 2024/0070302 A1 | 2/2024 | Cho et al. | |
| 2024/0071020 A1 | 2/2024 | Cho et al. | |

FOREIGN PATENT DOCUMENTS

| | | | |
|---|---|---|---|
| KR | 20100064708 A | 6/2010 | |
| KR | 1020100064708 A | 6/2010 | |
| KR | 20150132803 A | 11/2015 | |
| KR | 1020150132803 A | 11/2015 | |
| KR | 20190007791 A | 1/2019 | |
| KR | 1020190007791 A | 1/2019 | |
| KR | 20210032553 A | 3/2021 | |
| KR | 1020210032553 A | 3/2021 | |
| WO | 2015192117 A1 | 12/2015 | |
| WO | 2020165885 A1 | 8/2020 | |
| WO | 2022147146 A1 | 7/2022 | |
| WO | 2022164962 A1 | 8/2022 | |
| WO | 2022178234 A1 | 8/2022 | |

OTHER PUBLICATIONS

International Search Report and Written Opinion received in Patent Cooperation Treaty Application No. PCT/US2023/028387, dated Nov. 7, 2023.

International Search Report and Written Opinion received in Patent Cooperation Treaty Application No. PCT/US2023/028460, dated Jul. 24, 2023.

International Search Report and Written Opinion received in Patent Cooperation Treaty Application No. PCT/US2023/028468, dated Nov. 14, 2023.

International Search Report and Written Opinion received in Patent Cooperation Treaty Application No. PCT/US2023/028536, dated Nov. 10, 2023.

International Search Report and Written Opinion received in Patent Cooperation Treaty Application No. PCT/US2023/028537, dated Nov. 6, 2023.

International Search Report and Written Opinion received in Patent Cooperation Treaty Application No. PCT/US2023/028542, dated Nov. 13, 2023.

International Search Report and Written Opinion received in Patent Cooperation Treaty Application No. PCT/US2023/028664, dated Nov. 22, 2023.

International Search Report and Written Opinion received in Patent Cooperation Treaty Application No. PCT/US2023/028671, dated Nov. 13, 2023.

Extended European Search Report for EP 23861058.8 dated Feb. 11, 2026, 9 pages.

* cited by examiner

Mobile
Device
401

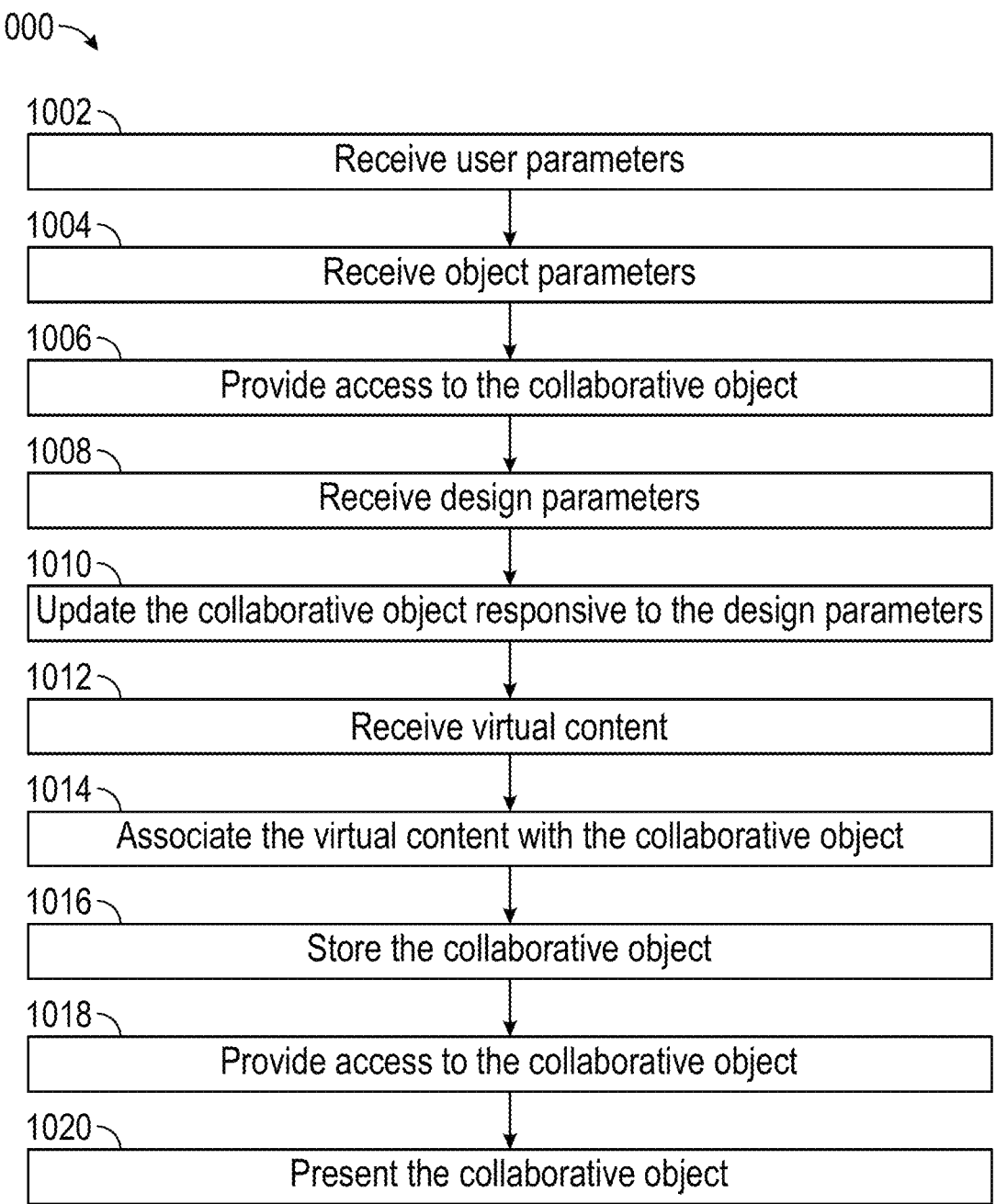

1000

1002
Receive user parameters

1004
Receive object parameters

1006
Provide access to the collaborative object

1008
Receive design parameters

1010
Update the collaborative object responsive to the design parameters

1012
Receive virtual content

1014
Associate the virtual content with the collaborative object

1016
Store the collaborative object

1018
Provide access to the collaborative object

1020
Present the collaborative object

1102
Receive user identifiers

1104
Receive access parameters for the users

1106
Maintain table

1108
Maintain timer

1110
Provide access to the collaborative object

1112
Identify an access level change

1114
Change the respective access level

1300

1302
Provide users with access to a collaborative object

1304
Associate virtual content from users with collaborative object

1306
Determine a hand gesture

1308
Track a path of the hand gesture

1310
Identify an image segment of the displayed image

1312
Associate the image segment to the collaborative object

SCISSOR HAND GESTURE FOR A COLLABORATIVE OBJECT

CROSS-REFERENCE TO RELATED APPLICATIONS

This application is a Continuation of U.S. application Ser. No. 17/900,812 filed on Aug. 31, 2022, the contents of which are incorporated fully herein by reference.

TECHNICAL FIELD

Examples set forth in the present disclosure relate to the field of virtual reality for electronic devices, including mobile devices and wearable devices such as eyewear devices. More particularly, but not by way of limitation, the present disclosure describes a collaborative method with selective access.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems, and displays.

Graphical user interfaces allow the user to interact with displayed content, including virtual objects and graphical elements such as icons, taskbars, list boxes, menus, buttons, and selection control elements like cursors, pointers, handles, and sliders.

Virtual reality (VR) technology generates a complete virtual environment including realistic images, sometimes presented on a VR headset or other head-mounted display. VR experiences allow a user to move through the virtual environment and interact with virtual objects. Augmented reality (AR) is a type of VR technology that combines real objects in a physical environment with virtual objects and displays the combination to a user. The combined display gives the impression that the virtual objects are authentically present in the environment, especially when the virtual objects appear and behave like the real objects. Cross reality (XR) is generally understood as an umbrella term referring to systems that include or combine elements from AR, VR, and MR (mixed reality) environments.

Collaborative tools are available to users of VR technology. The collaborative tools enable users to virtually meet in a collaborative session. During a collaborative session, users can communicate with one another in a virtual setting.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 10 is a flow chart listing the steps in an example collaboration method;

DETAILED DESCRIPTION

Figure 1A:
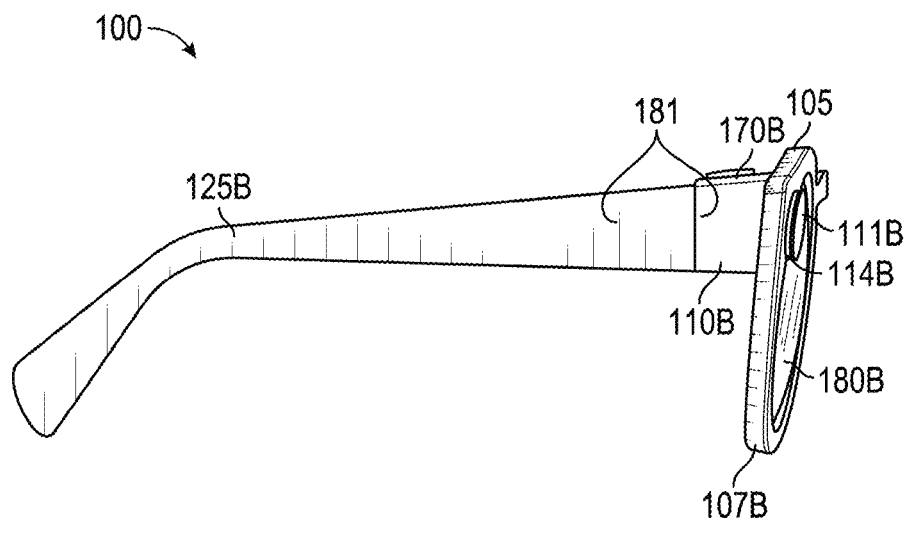
FIG. 1A is a side view (right) of an example hardware configuration of an eyewear device suitable for use in an example collaboration system.

A collaborative session (e.g., a virtual time capsule) in which access to a collaborative object and added virtual content is selectively provided to participants/users. In one example of the collaborative session, a user crops media content by use of a hand gesture to produce an image segment that is associated to the collaborative object. The hand gesture resembles a pair of scissors, and a camera and processor of a client device tracks a path of the hand gesture to identify an object within a displayed image to create virtual content of the identified object. The virtual content created by the hand gesture is then associated to the collaborative object.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Advanced AR technologies, such as computer vision and object tracking, may be used to produce a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. Hand and finger recognition and tracking in real time is one of the most challenging and processing-intensive tasks in the field of computer vision.

The term "pose" refers to the static position and orientation of an object at a particular instant in time. The term "gesture" refers to the active movement of an object, such as a hand, through a series of poses, sometimes to convey a signal or idea. The terms, pose and gesture, are sometimes used interchangeably in the field of computer vision and augmented reality. As used herein, the terms "pose" or "gesture" (or variations thereof) are intended to be inclusive of both poses and gestures; in other words, the use of one term does not exclude the other.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1B:
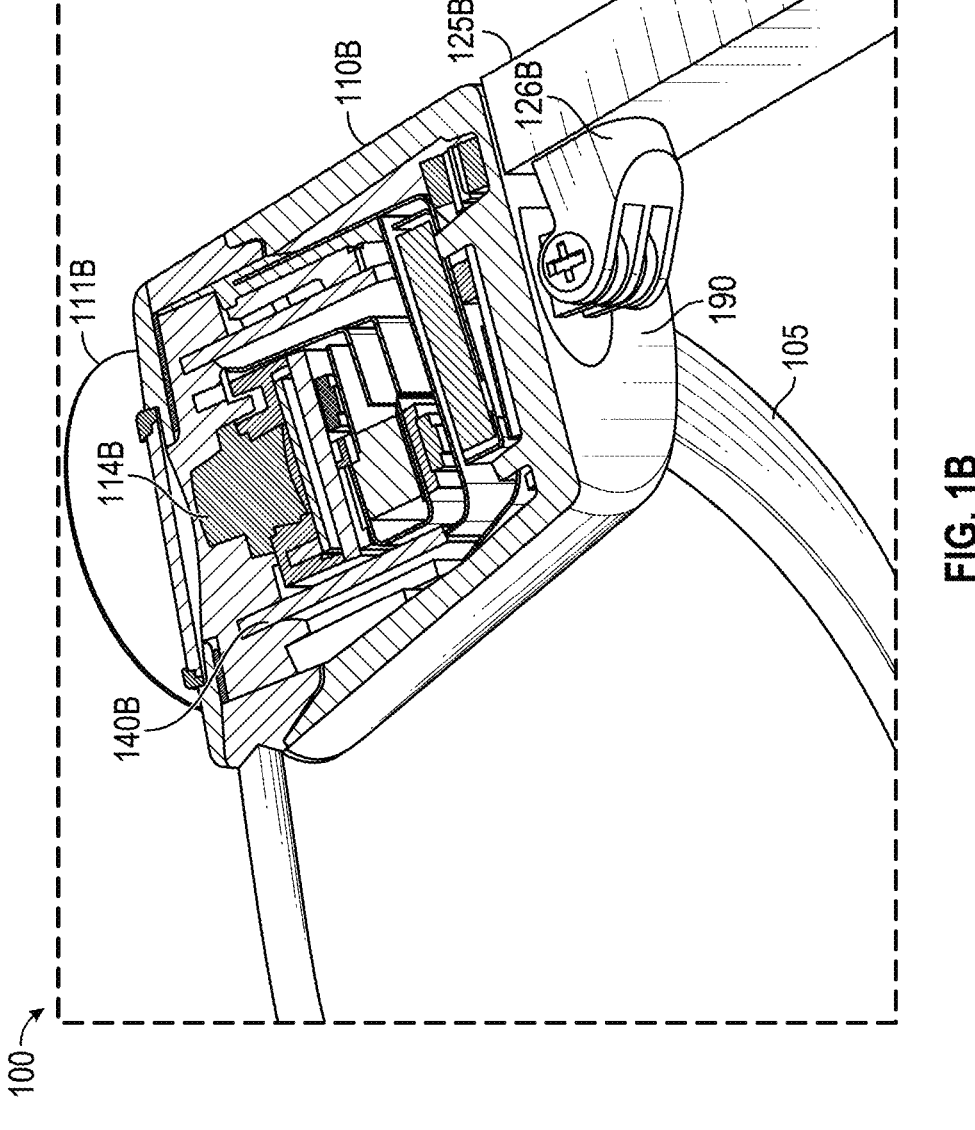
FIG. 1B is a perspective, partly sectional view of a right corner of the eyewear device of FIG. 1A depicting a right visible-light camera, and a circuit board.
Figure 1C:
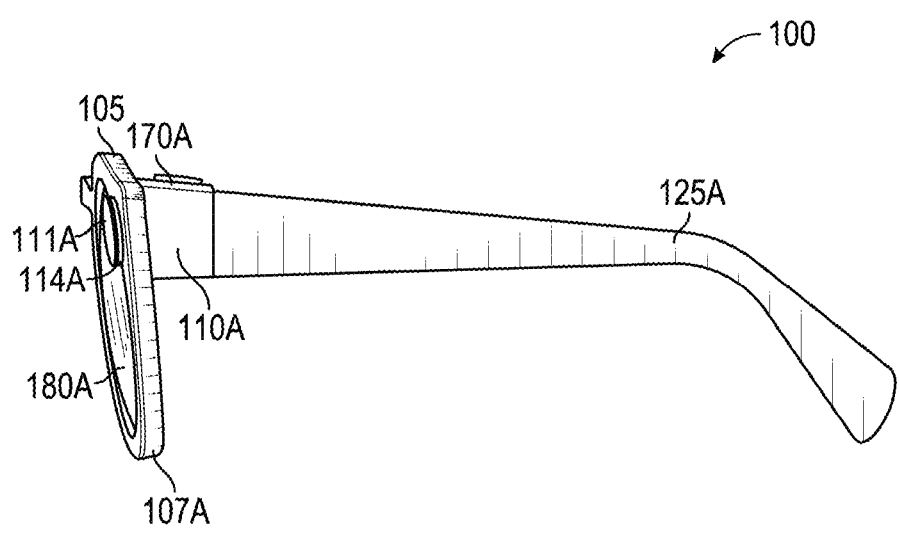
FIG. 1C is a side view (left) of an example hardware configuration of the eyewear device of FIG. 1A, which shows a left visible-light camera.

FIG. 1A is a side view (right) and FIG. 1C is a side view (left) of an example hardware configuration of an eyewear device 100 that includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a left visible-light camera 114A and a right visible-light camera 114B. As further described herein, the two cameras 114A, 114B capture image information for a scene from two separate viewpoints. The two captured images may be used to project a three-dimensional display onto an image display for viewing with 3D glasses.

Figure 1D:
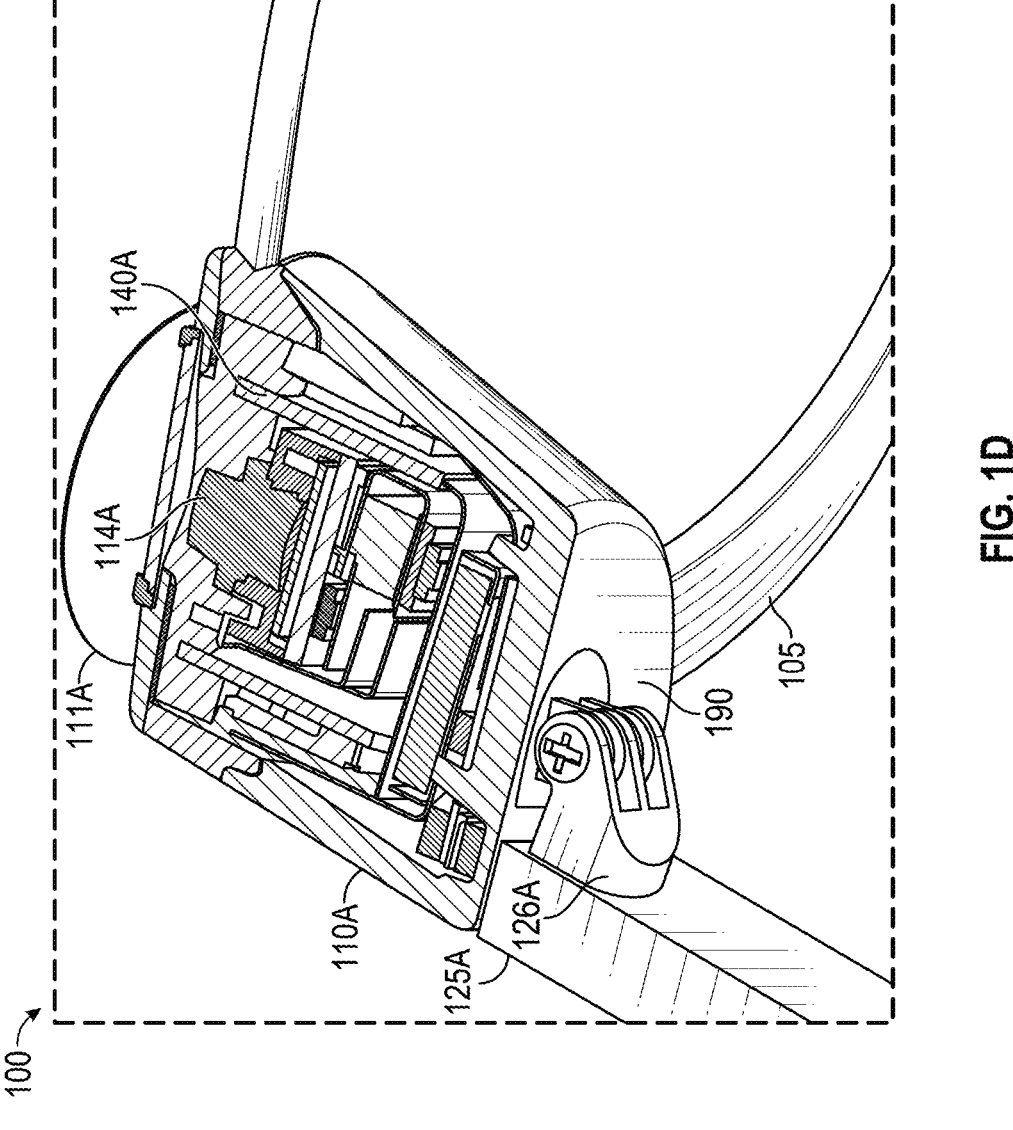
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1C, the eyewear device 100 can include multiple visible-light cameras 114A, 114B that form a passive type of three-dimensional camera, such as stereo camera, of which the right visible-light camera 114B is located on a right corner 110B and, as shown in FIGS. 1C-D, a left visible-light camera 114A is located on a left corner 110A.

Figure 3:
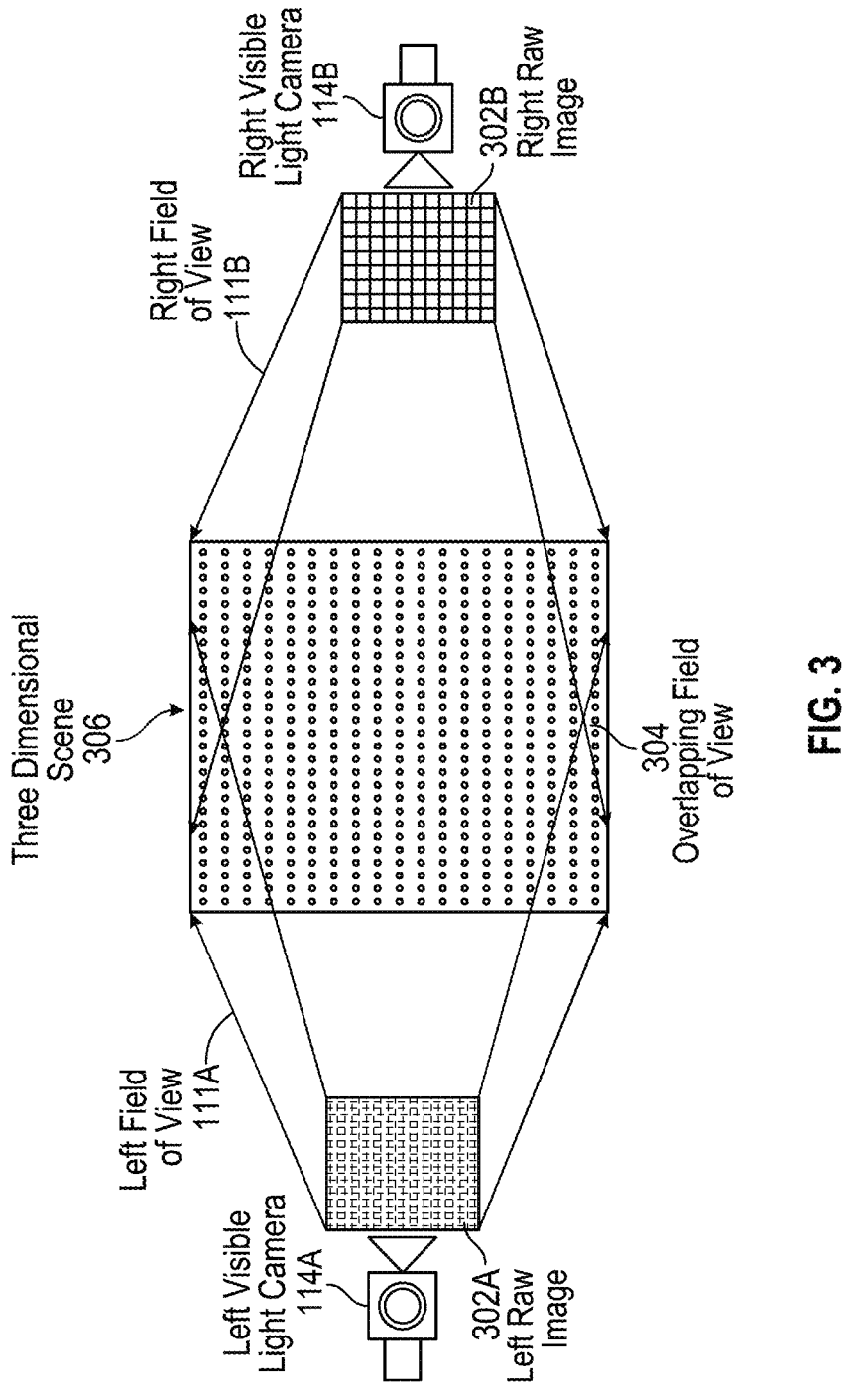
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, left visible-light camera 114A captures a left field of view 111A and right visible-light camera 114B captures a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include digital camera elements such as high-resolution complementary metal-oxide-semiconductor (CMOS) image sensor and a digital VGA camera (video graphics array) capable of resolutions of 480p (e.g., 640×480 pixels), 720p, 1080p, or greater. Other examples include visible-light cameras 114A, 114B that can capture high-definition (HD) video at a high frame rate (e.g., thirty to sixty frames per second, or more) and store the recording at a resolution of 1216 by 1216 pixels (or greater).

The eyewear device 100 may capture image sensor data from the visible-light cameras 114A, 114B along with geo-location data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

As shown in the example of FIG. 1B, the eyewear device 100 includes the right visible-light camera 114B and a circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B.

Construction and placement of the left visible-light camera 114A is substantially similar to the right visible-light camera 114B, except the connections and coupling are on the left lateral side 170A. A left hinge 126B connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The left and right corners 110A and 110B each include a corner body 190 and a corner cap, with the corner caps omitted in the cross-sections of FIGS. 1B and 1D. Disposed inside the left and right corners 110A and 110B are various interconnected circuit boards 140A and 140B, such as PCBs or flexible PCBs, that include controller circuits for left and right visible-light cameras 114A and 114B, microphone(s), low-power wireless circuitry (e.g., for wireless short range network communication via Bluetooth™), high-speed wireless circuitry (e.g., for wireless local area network communication via Wi-Fi). The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

The left and right visible-light cameras 114A and 114B are coupled to or disposed on respective flexible PCBs 140A and 140B and are covered by visible-light camera cover lens, which are aimed through opening(s) formed in the frame 105. For example, the left and right rims 107A and 107B of the frame 105 are connected to the left and right corners 110A and 110B and include the openings for the visible-light camera cover lenses. The frame 105 includes a front side configured to face outward and away from the eye of the user. The opening for the visible-light camera cover lens is formed on and through the front or outward-facing side of the frame 105. In the example, the left and right visible-light cameras 114A and 114B each has a respective outward-facing field of view 111A and 111B with a line of sight or perspective that is correlated with the respective left and right eyes of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

Figure 2A:
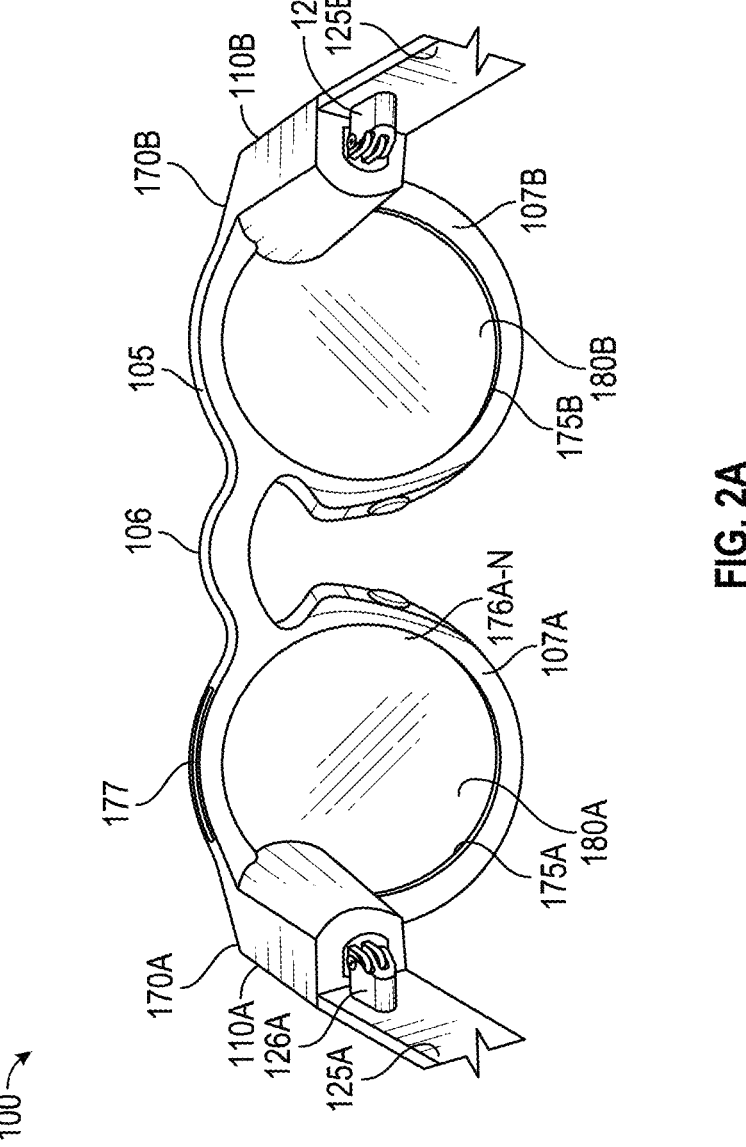
FIGS. 2A and 2B are rear views of example hardware configurations of an eyewear device utilized in an example collaboration system.
Figure 2B:
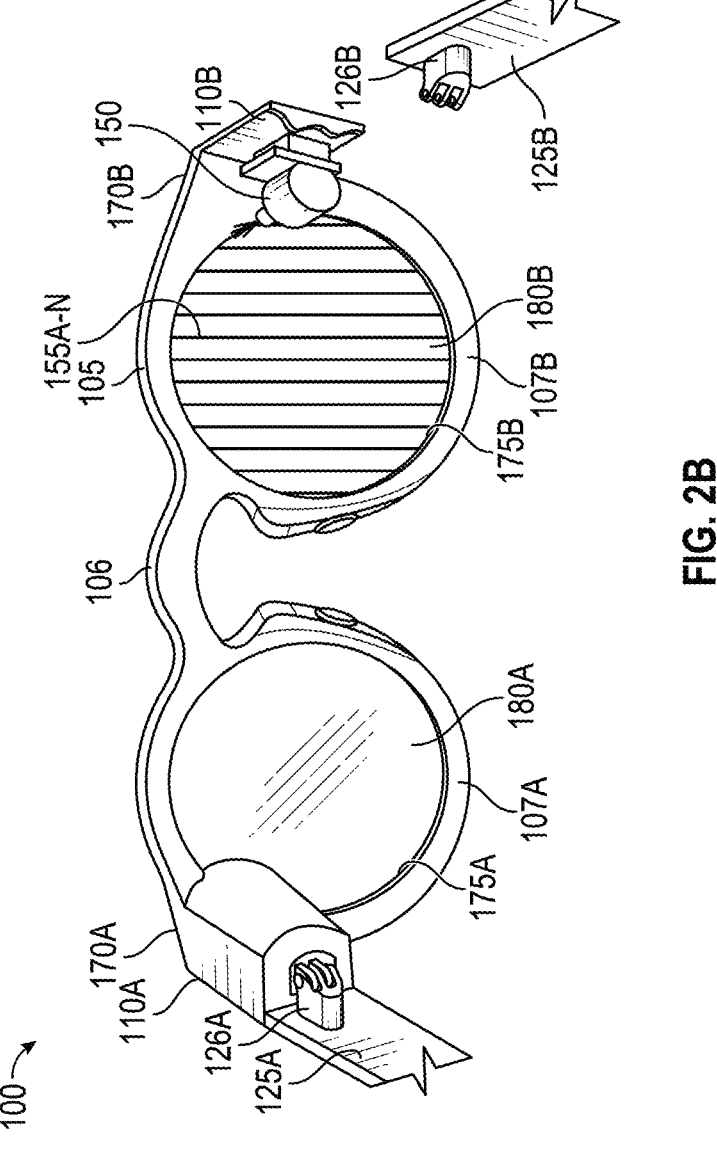

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge or diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied that makes the layer opaque (closing or blocking the lens). The image processor 412 (FIG. 4) on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

In another example, the eyewear device 100 shown in FIG. 2B may include two projectors, a left projector (not shown) and a right projector 150. The left optical assembly 180A may include a left display matrix 177 or a left set of optical strips (not shown) which are configured to interact with light from the left projector. Similarly, the right optical assembly 180B may include a right display matrix (not shown) or a right set of optical strips 155A, 155B, . . . 155N which are configured to interact with light from the right projector 150. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time-a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

Figure 4:
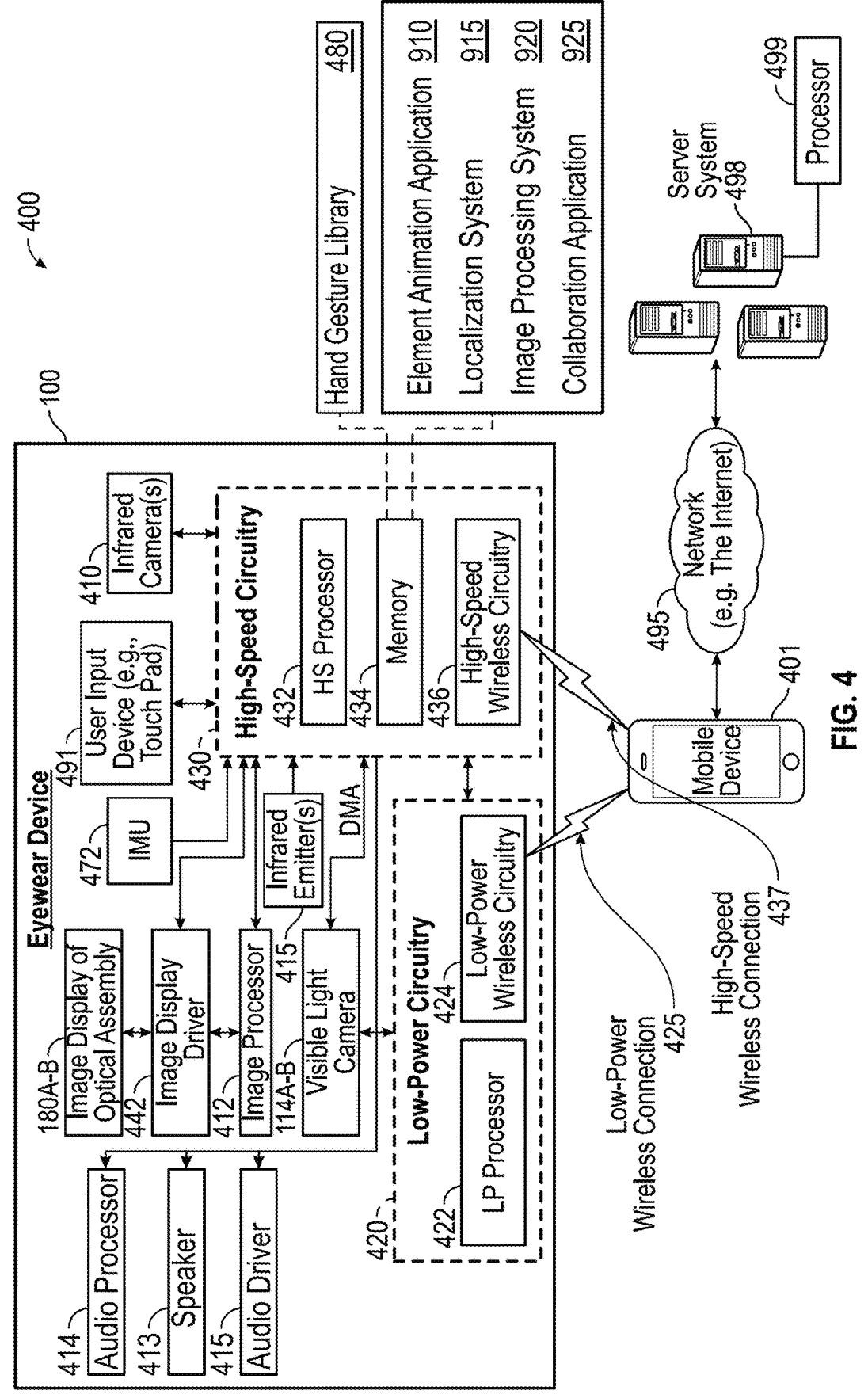
FIG. 4 is a functional block diagram of an example collaboration system including a wearable device (e.g., an eyewear device) and a server system connected via various networks.

FIG. 4 is a functional block diagram of an example collaboration system 400 that includes a wearable device (e.g., an eyewear device 100), a mobile device 401, and a server system 498 connected via various networks 495 such as the Internet. The server system 498 may be one or more computing devices as part of a service or network computing system, for example, that include a processor, a memory, and network communication interface to communicate over the network 495 with an eyewear device 100 and a mobile device 401. The server system 498 includes a server processor 499 that may be configured to host collaboration sessions. Functionality of the eyewear device 100 or mobile device 401 described herein, such as collaboration processing and serving collaborative objects to users, can be performed by the processor 499 of the server system 498.

The eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor 213, which uses infrared signals to estimate the position of objects relative to the device 100. The depth sensor that in some examples includes one or more infrared emitter(s) 215 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes one or more microphones (not shown) and one or more speakers 413 (e.g., one associated with the left side of the eyewear device and another associated with the right side of the eyewear device). The speakers 413 may be incorporated into the frame 105, temples 125, or corners 110 of the eyewear device 100. The one or more speakers 413 are driven by an audio processor 414 and audio driver 415 under control of low-power circuitry 420, high-speed circuitry 430, or both. The speakers 413 are for presenting audio signals including, for example, a beat track. The audio processor 414 are coupled to the microphones and the speakers 413 in order to control the respective capture and presentation of sound.

The components shown in FIG. 4 for the eyewear device 100 are located on one or more circuit boards, for example a printed circuit board (PCB) or flexible printed circuit (FPC), located in the frame or temples. Alternatively, or additionally, the depicted components can be located in the corners, rims, hinges, or bridge of the eyewear device 100.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via a low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

As shown in FIG. 4, the high-speed processor 432 of the eyewear device 100 can be coupled to the camera system (visible-light cameras 114A, 114B), the image display driver 442, the user input device 491, and the memory 434.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker 413, or a vibrating actuator), or an outward-facing signal (e.g., an LED, a loudspeaker 413). The image displays of each optical assembly 180A, 180B are driven by the image display driver 442. In some example configurations, the output components of the eyewear device 100 further include additional indicators such as audible elements (e.g., loudspeakers 413), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, a one or more speakers 413 positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), visual input components (e.g., cameras 114/420), and audio input components (e.g., a microphone), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw).

Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

Figure 5:
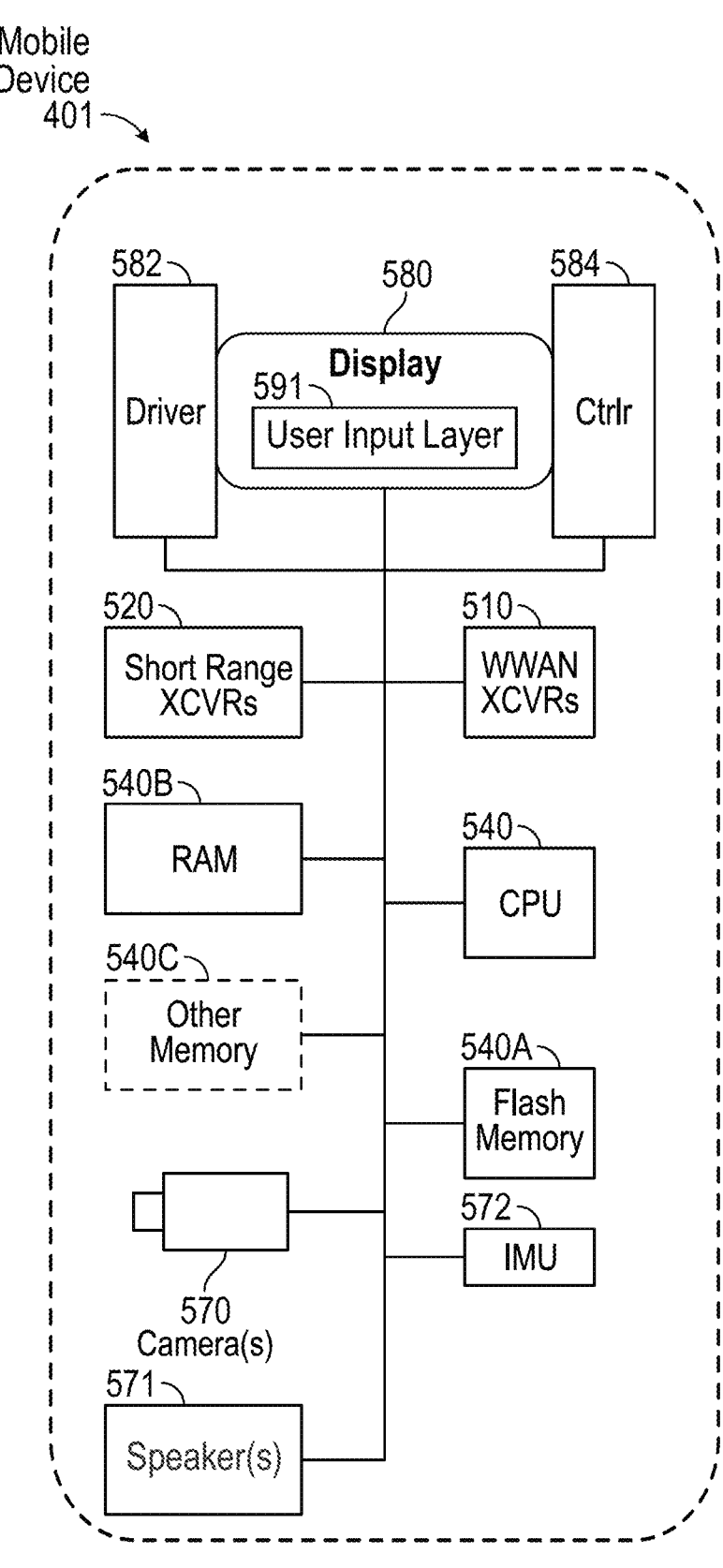
FIG. 5 is a diagrammatic representation of an example hardware configuration for a mobile device suitable for use in the example system of FIG. 4.

The illustrated collaboration system 400, as shown in FIG. 4, includes a computing device, such as mobile device 401, coupled to an eyewear device 100 over a network. The collaboration system 400 includes a memory for storing instructions and a processor for executing the instructions. Execution of the instructions of the collaboration system 400 by the processor 432 configures the eyewear device 100 to cooperate with the mobile device 401. The collaboration system 400 may utilize the memory 434 of the eyewear device 100 or the memory elements 540A, 540B, 540C of the mobile device 401 (FIG. 5). Also, the collaboration system 400 may utilize the processor elements 432, 422 of the eyewear device 100 or the central processing unit (CPU) 540 of the mobile device 401 (FIG. 5). In addition, the collaboration system 400 may further utilize the memory and processor elements of the server system 498. In this aspect, the memory and processing functions of the collaboration system 400 can be shared or distributed across the processors and memories of the eyewear device 100, the mobile device 401, and the server system 498 to implement functionality described herein.

The memory 434, in some example implementations, includes or is coupled to a hand gesture library 480, as described herein. The process of detecting a hand shape or gesture, in some implementations, involves comparing the pixel-level data in one or more captured frames of video data by the eyewear 100 or mobile device 401 to the hand shapes and gestures stored in the library 480 until a good match is found. A gesture may be a static gesture that can be detect in one or a few frames of data or a dynamic gesture that is detected over the course of two or more frames of data.

The memory 434 additionally includes, in some example implementations, an element animation application 910, a localization system 915, an image processing system 920, and a collaboration application 925. In a collaboration system 400 in which a camera is capturing frames of video data, the element animation application 910 configures the processor 432 to control the movement of a series of virtual items 700 on a display in response to detecting one or more inputs, e.g., IMU data, captured images, and hand shapes or gestures. The localization system 915 configures the processor 432 to obtain localization data for use in determining the position of the eyewear device 100 relative to the physical environment. The localization data may be derived from a series of images, an IMU unit 472, a GPS unit, or a combination thereof. The image processing system 920 configures the processor 432 to present a captured image on a display of an optical assembly 180A, 180B in cooperation with the image display driver 442 and the image processor 412. The collaboration application 925 configures the processor 432 to implement collaboration functions described herein.

FIG. 5 is a high-level functional block diagram of an example mobile device 401. Mobile device 401 includes a flash memory 540A which stores programming to be executed by the CPU 540 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. The mobile device 401 may additionally include a speaker 571. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus, or other tool), a camera 570 for capturing images of objects (including hands of the user and potential virtual content), and an image display 580 for displaying content.

As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the eyewear device 100 or the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted between the eyewear device 100 or mobile device 401 over one or more network connections via XCVRs 510, 520.

The mobile device 401 in some examples includes a collection of motion-sensing components referred to as an inertial measurement unit (IMU) 572 for sensing the position, orientation, and motion of the client device 401. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the client device 401 (including the acceleration due to gravity) relative to three orthogonal axes (x, y, z). The gyroscope senses the angular velocity of the client device 401 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the client device 401 relative to magnetic north.

The IMU 572 may include or cooperate with a digital motion processor or programming that gathers the raw data from the components and compute a number of useful values about the position, orientation, and motion of the client device 401. For example, the acceleration data gathered from the accelerometer can be integrated to obtain the velocity relative to each axis (x, y, z); and integrated again to obtain the position of the client device 401 (in linear coordinates, x, y, and z). The angular velocity data from the gyroscope can be integrated to obtain the position of the client device 401 (in spherical coordinates). The programming for computing these useful values may be stored in on or more memory elements 540A, 540B, 540C and executed by the CPU 540 of the client device 401.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 540 in FIG. 5. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 540, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 540 or processor hardware in smartphone, laptop computer, and tablet.

The CPU 540 serves as a programmable host controller for the mobile device 401 by configuring the mobile device 401 to perform various operations, for example, in accordance with instructions or programming executable by CPU 540. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 540, e.g., as a working data processing memory. The flash memory 540A typically provides longer-term storage.

Hence, in the example of mobile device 401, the flash memory 540A is used to store programming or instructions for execution by the CPU 540. Depending on the type of device, the mobile device 401 stores and runs a mobile operating system through which specific applications are executed. Examples of mobile operating systems include Google Android, Apple IOS (for iPhone or iPad devices), Windows Mobile, Amazon Fire OS, RIM BlackBerry OS, or the like.

As shown in FIG. 5, the CPU 540 of the mobile device 401 may be coupled to a camera system 570, a mobile display driver 582, a user input layer 591, and a memory 540A. Components and functionality of the eyewear device 100 described herein can be incorporated into the mobile device 401. Likewise, components and functionality of the mobile device 401 described herein may be incorporated into the eyewear device 100.

The processor 432 within the eyewear device 100 or the processor 540 within the mobile device 401 may construct a map of the environment surrounding the respective device, determine a location of the device within the mapped environment, and determine a relative position of the device to one or more objects in the mapped environment. The processor 432/540 may construct the map and determine location and position information using a conventional simultaneous localization and mapping (SLAM) algorithm applied to data received from one or more sensors. Sensor data includes images received from one or both of the cameras 114A, 114B or camera(s) 570, distance(s) received from a laser range finder, position information received from a GPS unit, motion and acceleration data received from an IMU 472/572, or a combination of data from such sensors, or from other sensors that provide data useful in determining positional information.

In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate; in other words, calculating and updating the mapping and localization thirty times per second.

Figure 6:
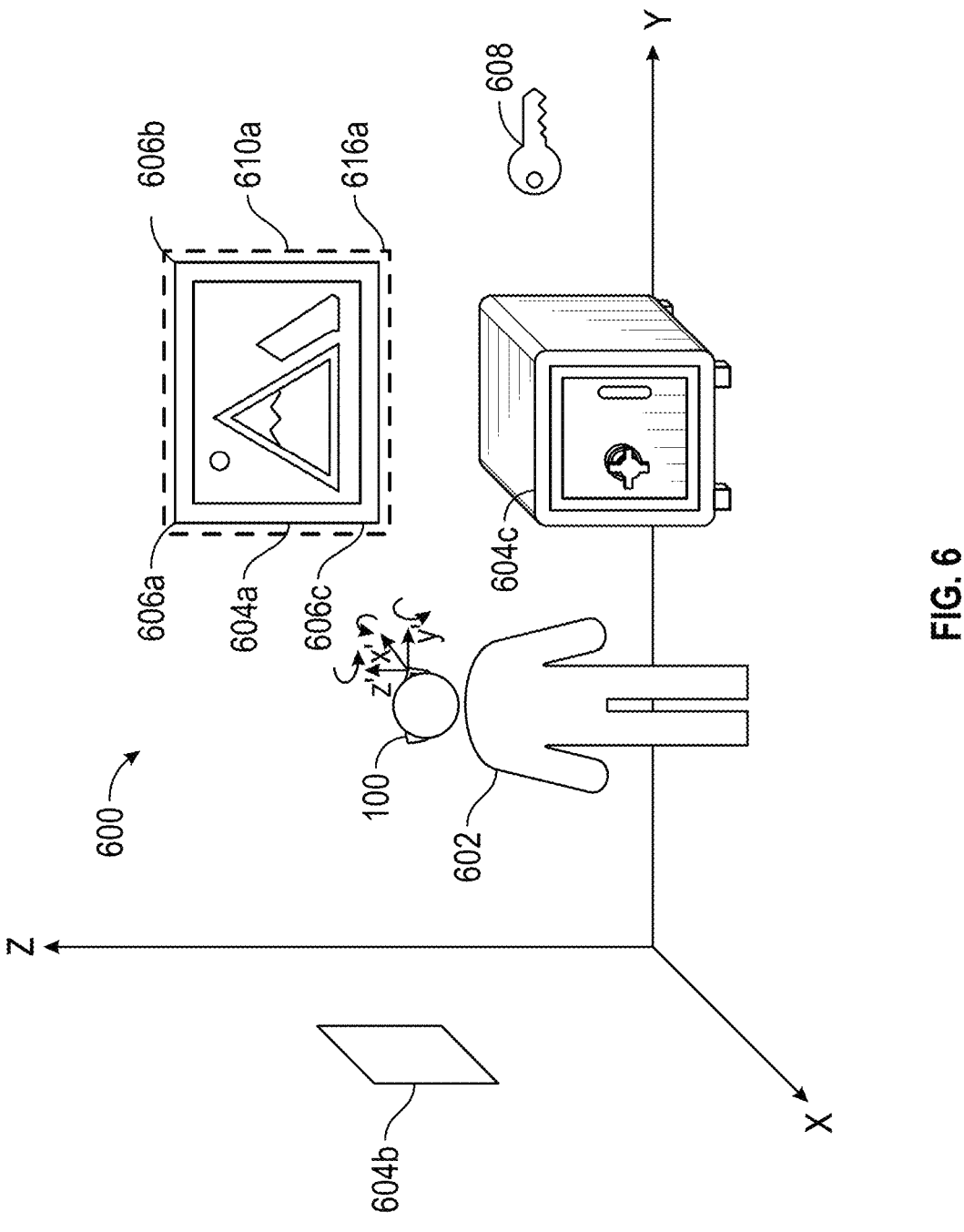
FIG. 6 is a schematic illustration of a user in an example environment for use in describing simultaneous localization and mapping.

FIG. 6 depicts an example physical environment 600 along with elements that are useful when using a SLAM application and other types of tracking applications (e.g., natural feature tracking (NFT)). Although the following example is provided with reference to eyewear device 100, the example can be implemented in a similar manner in a mobile device 401. A user 602 of eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. The processor 432 of the eyewear device 100 may position a virtual object 608 (such as the key shown in FIG. 6) within the environment 600 for viewing during an augmented reality experience such as a collaborative augmented reality experience where each user has a respective augmented reality device (e.g., eyewear device 100 or mobile device 401.

The localization system 915 in some examples associates a virtual marker 610a with a virtual object 608 in the environment 600. In augmented reality, markers are registered at locations in the environment to assist devices with the task of tracking and updating the location of users, devices, and objects (virtual and physical) in a mapped environment. Markers are sometimes registered to a high-contrast physical object, such as the relatively dark object, such as the framed picture 604a, mounted on a lighter-colored wall, to assist cameras and other sensors with the task of detecting the marker. The markers may be preassigned or may be assigned by the eyewear device 100 upon entering the environment.

Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610*a*, the marker's position (location and orientation), one or more virtual objects, or a combination thereof. The marker position may include three-dimensional coordinates for one or more marker landmarks 616*a*, such as the corner of the generally rectangular marker 610*a* shown in FIG. 6. The marker location may be expressed relative to real-world geographic coordinates, a system of marker coordinates, a position of the eyewear device 100, or other coordinate system. The one or more virtual objects associated with the marker 610*a* may include any of a variety of material, including still images, video, audio, tactile feedback, executable applications, interactive user interfaces and experiences, and combinations or sequences of such material. Any type of content capable of being stored in a memory and retrieved when the marker 610*a* is encountered or associated with an assigned marker may be classified as a virtual object in this context. The key 608 shown in FIG. 6, for example, is a virtual object displayed as a still image, either 2D or 3D, at a marker location.

In one example, the marker 610*a* may be registered in memory as being located near and associated with a physical object 604*a* (e.g., the framed work of art shown in FIG. 6). In another example, the marker may be registered in memory as being a particular position with respect to the eyewear device 100.

Figure 7:
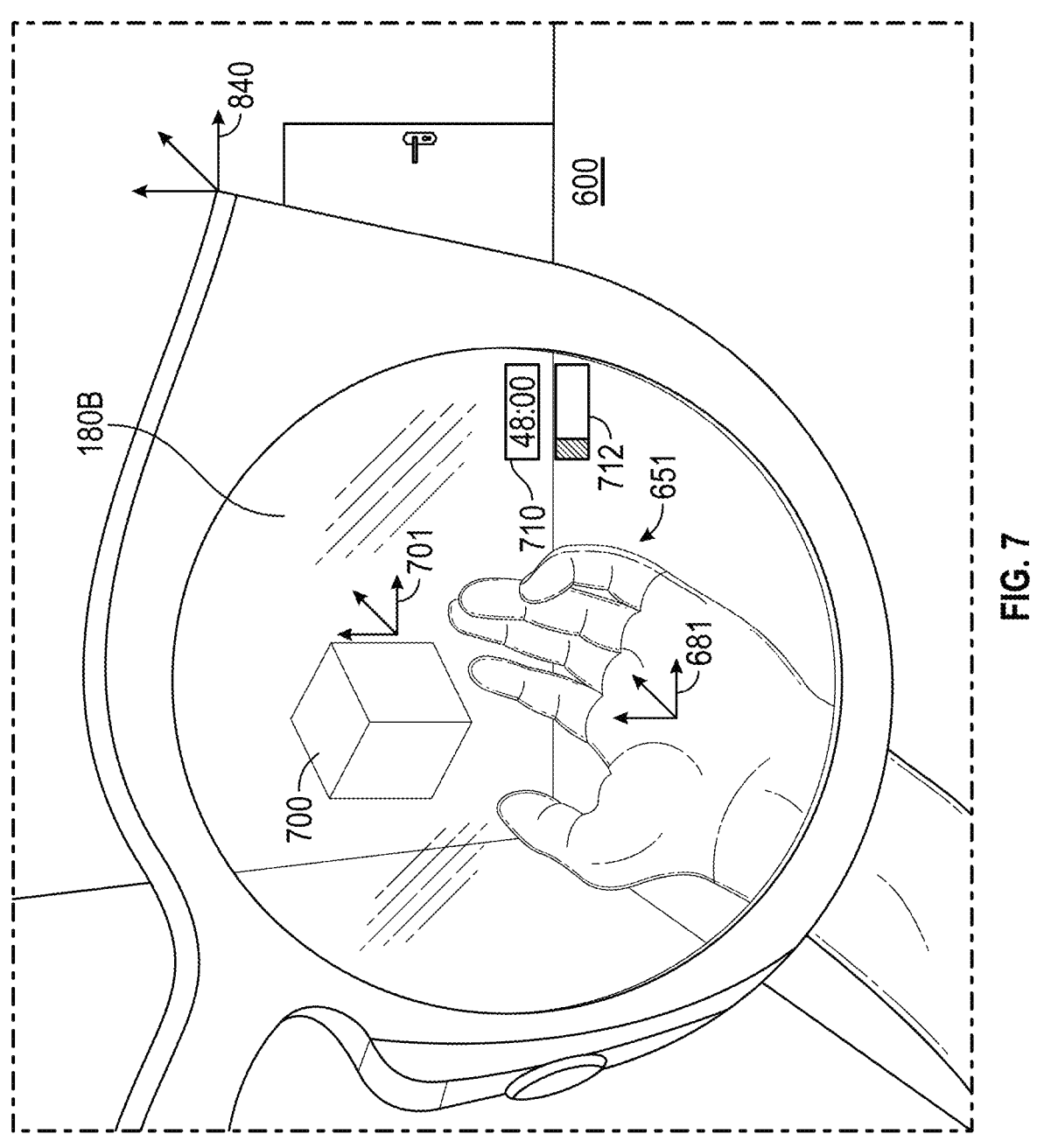
FIG. 7 is a perspective illustration of an example collaborative object in the form of a box that may be manipulated with a hand.
Figure 8:
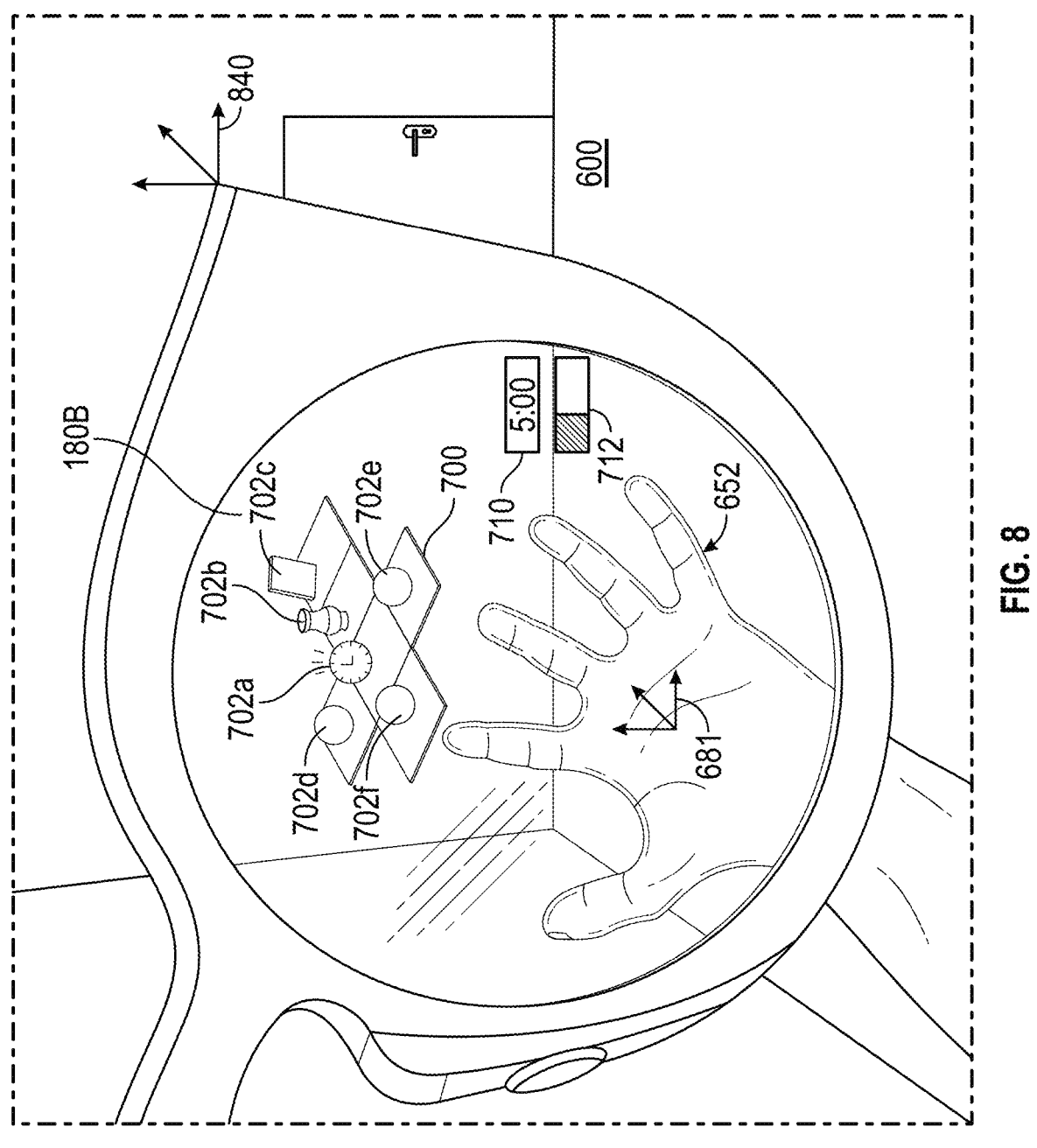
FIG. 8 is a perspective illustration of an example first hand gesture associated with an opening gesture for opening the box depicted in FIG. 7.
Figure 9:
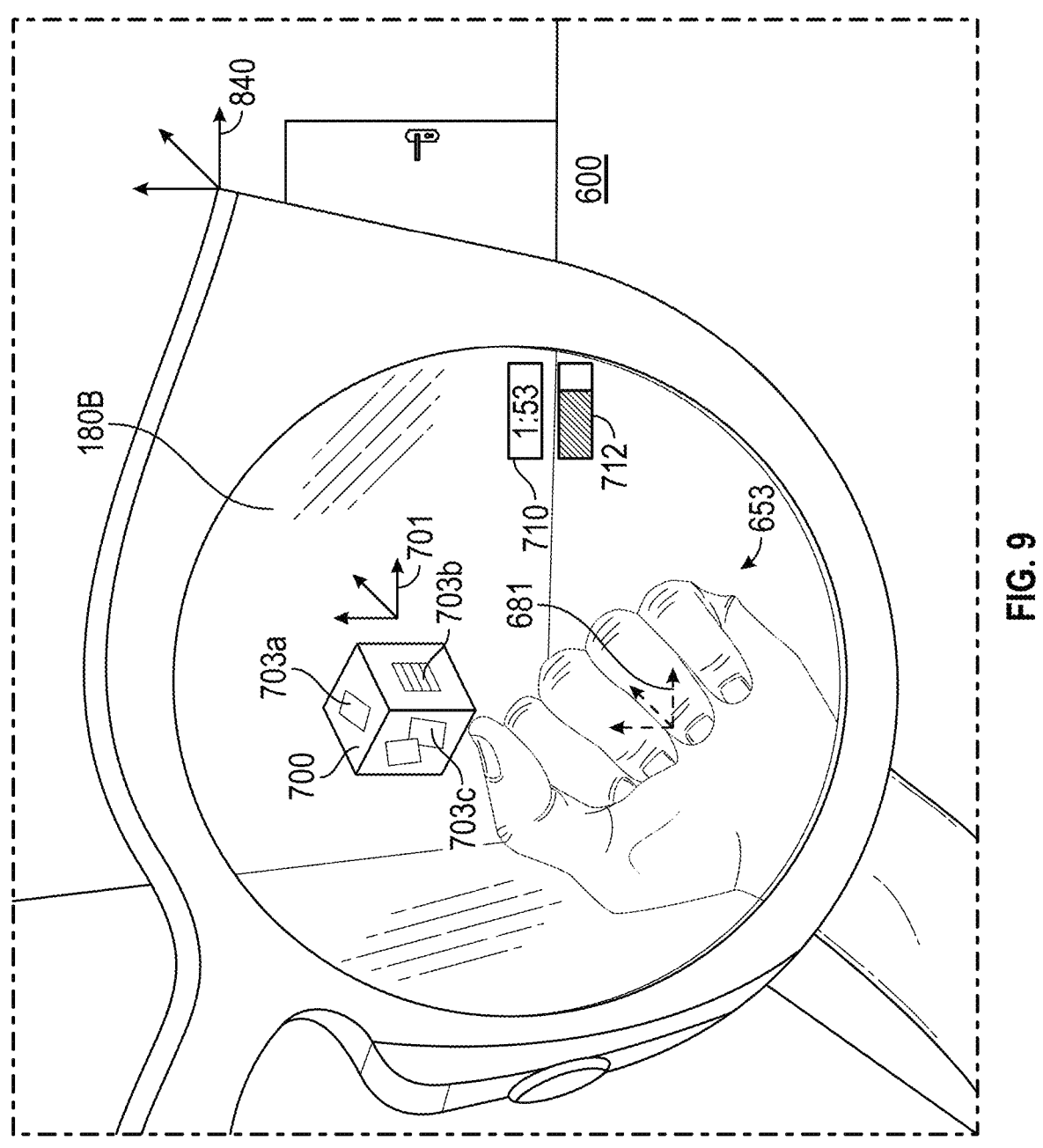
FIG. 9 is a perspective illustration of an example second hand gesture associated with a closing gesture for closing the box depicted in FIG. 7.

FIGS. 7, 8, and 9 are illustrations of an example collaborative object 700 being developed by adding virtual content 702 during a collaboration period of a collaboration session for use in describing the steps of the methods illustrated in FIGS. 10 and 11 below (e.g., to create a virtual time capsule). Although a box is used for the collaborative object 700 in many of the examples described herein, any virtual object may be selected for use as the collaborative object 700. Additionally, although the illustrations depict an eyewear device 100 as the physically remote device it is to be understood that the functionality described below can be implemented using other physically remote devices such as mobile device 401.

FIG. 7 provides a perspective view of an example collaborative object 700 in the form of a box in a first state (closed) that may be manipulated in three dimensions 701 with a hand 651 (e.g., through detected gestures in images or touch inputs on a touchscreen) based on corresponding movements in three dimensions 681. For example, the hand 651 may be rotated to rotate the collaborative object. In some example, an extended index finger may be detected adjacent the collaborative object and a corresponding audible signal will be presented via a speaker when the user makes a tapping gesture. The location of the eyewear device may also be tracked in three dimensions 840 within an environment 600 so that the overlays generated for presentation of the display 180B are more realistic. The hand 651 may be predefined to be the left hand, as shown. In some implementations, the system includes a process for selecting and setting the hand, right of left, which will serve as the hand 651 to be detected.

FIG. 8 provides a perspective view of the example collaborative object 700 in a second state (open) with associated virtual content 702 (watch face 702*a*, urn 702*b*, book 702*c*, other virtual content 702*d-f*) added during a collaboration period. The hand 652 is illustrated in the open position. This position of the hand 652 or the transition of the hand 651 in the relaxed position (FIG. 7) to the hand 652 in the open position may be set to correspond to opening the collaborative object 700 such that when this hand position or hand gesture is detected, the collaborative object 700 transitions to an open state.

FIG. 9 provides a perspective view of the example collaborative object 700 in the first state (closed) with virtual content 702 added to exterior surfaces of the collaborative object 700. The hand 653 is illustrated in a closed position. This position of the hand 653 or the transition of the hand 651 in the relaxed position (FIG. 7) to the hand 653 in the closed position may be set to correspond to closing the collaborative object 700 such that when this hand position or hand gesture is detected, the collaborative object 700 transitions to a closed state.

The process of detecting and tracking includes detecting the hand 651/652/653, over time, in various postures, in a set or series of captured frames of video data. In this context, detecting refers to and includes detecting a hand in as few as one frame of video data, as well as detecting the hand, over time, in a subset or series of frames of video data. Accordingly, in some implementations, the process includes detecting a hand 651 in a particular posture in one or more of the captured frames of video data. In other implementations, the process includes detecting the hand 651/652/653, over time, in various postures, in a subset or series of captured frames of video data.

FIG. 10 is a flow chart 1000 depicting an example method of developing a collaborative object 700 during a collaboration period of a collaboration session including multiple physically remote devices (e.g., eyewear devices 100, mobile devices 401, or a combination thereof). In an example, the steps of FIG. 10 are performed by the processor 499 of the server system 498 (see FIG. 4) accessible by the physically remote devices. In other examples, one or more steps may be performed by processors 432 and 540 of the physically remote devices or a combination of processors of the server system 498 and the physically remote device(s) (acting as a processor to implement the step(s)). One or more of the steps shown and described may be performed simultaneously, in a series, in an order other than shown and described, or in conjunction with additional steps. Some steps may be omitted or, in some applications, repeated.

At block 1002, the processor receives user parameters for the collaborative session. In an example, the processor receives user parameters from a physically remote device of a host user where the host user designates the user parameters through their physically remote device during a server system 498 connection. The user parameters include identifiers for the users that are permitted to access the collaborative session. User parameters may also include access levels identifying what individuals have access to during the collaborative session. Additional details regarding setting up and maintaining access levels is described below with reference to the steps of flow chart 1100 (FIG. 11).

At block 1004, the processor receives object parameters. In an example, the processor receives object parameters from a physically remote device of a host user (or other user with suitable access level) where the user designates the object parameters through their physically remote device during a server system 498 connection. The object parameters include identifiers identifying the object to be used as the collaborative object 700 (e.g., a box as illustrated in FIGS. 7-9). Other object parameters may include a material for the object (e.g., cardboard, metal, glass) or a time parameter 710/712 providing a time window or deadline during which the virtual content 702 can be added to the collaborative object 700 (after which the virtual content 702 can no longer be added to the collaborative object 700).

The processor of the sever system 498 may present the physically remote device via network 495 with a list of available virtual objects 702 for selection by the user through their device, which is received by the processor of the server system 498 upon selection. Alternatively, the user may send a virtual object 702 (e.g., a 3D image) they generated on their physically remote device to the server system 498, where the processor 499 of the sever system 498 designates the received virtual object 702 as the collaborative object 700 upon receipt.

At block 1006, the processor provides access to the collaborative object 700. The processor provides access to the collaborative object 700 through server connections with the physically remote devices based on the access level associated with each of the devices. In an example, the processor 499 develops the collaborative object 700 responsive to the object parameters received and stores the collaborative object 700 in a location accessible to the physically remote devices. The processor provides access to the collaborative object 700 based on the level of access associated with the user of the physically remote device. When a user accesses the collaborative object 700, the processor sends a file containing the collaborative object 700 that the physically remote device uses to generate an overlay for presentation on a display of the physically remote devices, such as display 180A-B of the eyewear device 100 or display 580 to the mobile device 401. The user may then interact with the representation of the collaborative object 700 on their display (e.g., using a hand gesture such as depicted in FIG. 7).

At block 1008, the processor receives design parameters. The processor receives design parameters from the physically remote devices having suitable permission levels accessing the collaborative object 700. In an example, the processor sends a file to the physically remote device containing the collaborative object 700. The physically remote device generates an overlay for display that the user can interact with to add design parameters to the collaborative object 700. The user may then, for example, select an image (e.g., from their camera, such as camera 114A-B or camera 570) and select a surface of the collaborative object 700 where, upon selection of the surface, the selected image is associated with the collaborative object 700 on the physically remote device. When the user makes a change on their device, the added/changed design parameter is communicated by the physically remote device to the server system 498 via network 498.

At block 1010, the processor updates the collaborative object 700 responsive to the design parameters. The processor updates the collaborative object 700 in response to changes received from the physically remote devices via network 495. In an example, upon receipt of the added/changed design parameter from the physically remote device, the processor associates the added/changed design parameter with the collaborative object 700 in the location accessible to the physically remote devices.

At block 1012, the processor receives virtual content 702. The processor receives virtual content 702 from the physically remote devices having suitable permission levels for accessing the collaborative object 700. In an example, the processor sends a file to the physically remote device containing the collaborative object 700. The physically remote device generates an overlay for display that the user can interact with to add virtual content 702 to the collaborative object 700. The user may then, for example, add visual virtual content 702 by selecting an image (e.g., from their camera) and performing an action (e.g., drag and drop the image on the collaborative object 700 or double tap on the object) to associate the virtual content 702 with the collaborative object 700 on the physically remote device. Additionally, audio virtual content may be added to the video virtual content by, for example, pressing and holding the video virtual content and speaking into a microphone where the audio received while depressing the video virtual content is associated with the video virtual content. When the user makes a change on their device, the added virtual content 702 is communicated by the physically remote device to the server system 498 via network 495.

In an example, the users may associate virtual content 702 with the collaborative object 700 by, for example, dragging and dropping the virtual content 702 onto a surface of the collaborative object 700. In one example, using an eyewear device 100, the eyewear device 100 may recognize hand gestures and the user may manipulate the displayed collaborative object 700 on display 180A-B and select the virtual content 702 via hand gestures captured and processed by the eyewear device 100. In another example, using a mobile device 401, the mobile device 401 may interpret instructions received via the touchscreen 580 of the mobile device 401. The user may manipulate the collaborative object 700 and select the virtual content 702 by touching/tapping the touchscreen 580 with their finger to select the virtual content 702 and by dragging their finger to move the virtual content 702 onto the collaborative object 700 (which may associate the virtual content 702 with the collaborative object 700).

At block 1014, the processor associates the virtual content 702 with the collaborative object 700. The processor associates the virtual content 702 with the collaborative object 700 by updating the collaborative object 700 in response to changes received from the physically remote devices. In an example, upon receipt of the added virtual content 702 from the physically remote device, the processor associates the added virtual content 702 with the collaborative object 700 in the location accessible to the physically remote devices.

At block 1016, the processor stores the collaborative object 700. The processor 499 stores the collaborative object 700 in memory accessible to the physically remote devices via a network 495 during a collaborative session.

At block 1018, the processor provides access to the collaborative object 700. The processor 499 provides access to the collaborative object 700 in memory accessible to the physically remote devices via a network 495. In an example, the processor checks credentials (e.g., user ID) of users requesting access and permits access if the credentials match credentials associated with the collaborative session for the collaborative object 700.

At block 1020, the processor presents the collaborative object 700. The processor 499 presents the collaborative object 700 to the physically remote devices via the network 495. In an example, the processor sends a file including the collaborative object 700 (and associated virtual content or links to such content) to a physically remote device having access to the collaborative session in response to a request from the physically remote device, which the physically remote device uses to generate an overlay including the collaborative object 700 and associated virtual content for presentation on the display of the remote physical devices. In one example, the associated virtual content is presented all at once when the collaborative object 700 is placed in an open state. In another example, the associated virtual content is presented in sequential order based on time stamps added when the virtual content was associated with the collaborative object 700.

Figure 11:
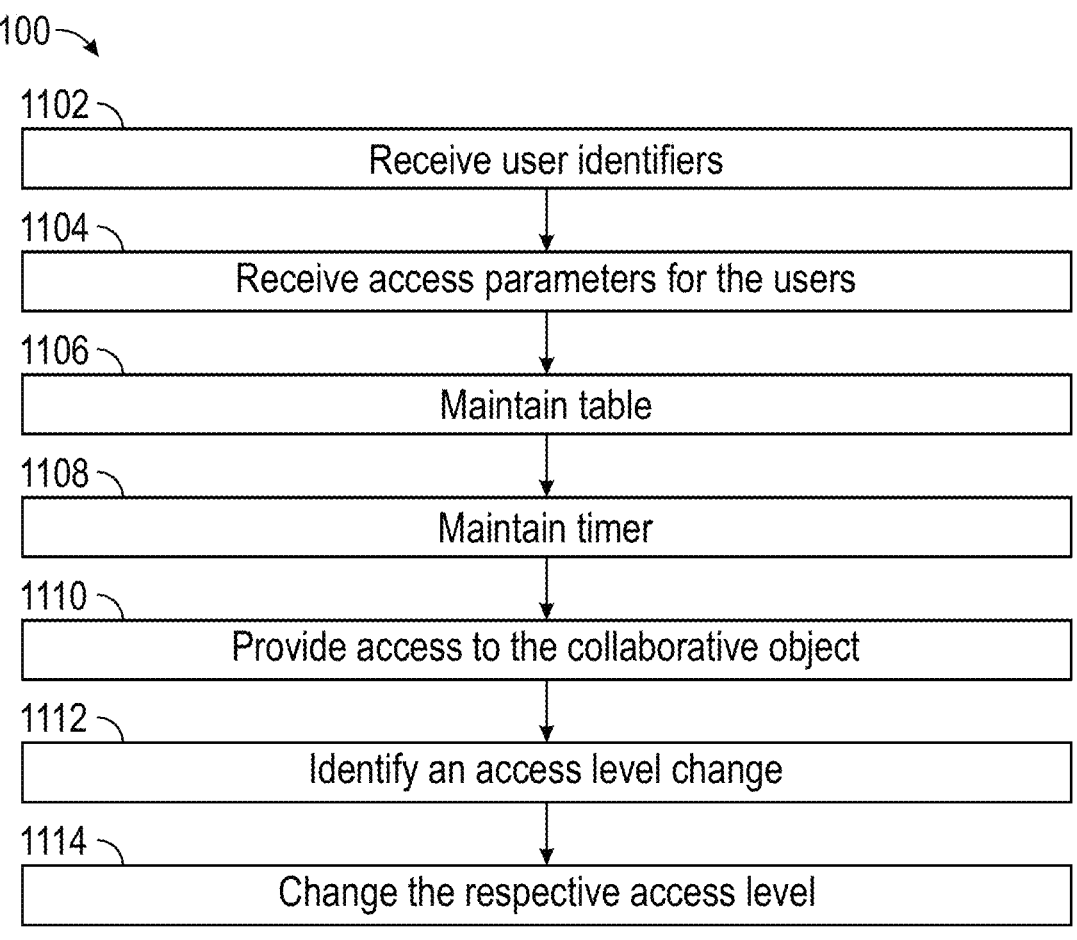
FIG. 11 is a flow chart listing the steps of an example selective collaboration object access method.

FIG. 11 is a flow chart listing the steps of an example selective collaboration object access method. In an example, the steps of FIG. 11 are performed by the processor 499 of the server system 498 (see FIG. 4) accessible by the physically remote devices. In other examples, one or more steps may be performed by processors 432 and 540 of the physically remote devices or a combination of processors 499 of the server system 498 and the physically remote device(s) (acting as a processor to implement the step(s)). One or more of the steps shown and described may be performed simultaneously, in a series, in an order other than shown and described, or in conjunction with additional steps. Some steps may be omitted or, in some applications, repeated.

At block 1102, the processor receives user identifiers. The processor receives user identifiers for users to be associated with a collaborative session. In one example, a user (the host) accesses the server system 498 using a physically remote device. Using the physically remote device, the user creates a collaborative sessions and designates other users for participation in the collaboration. For example, the host (user A) may invite another user (user B) to participate in a collaboration to prepare content for another user (user C) with the intent to provide that user with the content at a later date.

At block 1104, the processor receives access parameters for the users. The processor receives access parameters for the users from the host or another user with acceptable access levels. The access parameters indicate a respective access level to the collaborative object 700 of each of the users that allows the respective access level of at least one of the users to be different than the respective access level of another user. For example, the host may have a first access level (enabling access to access the collaborative object 700 in order to associate virtual content 704 and view associated virtual content 704 during a collaboration period) and another user may have a second level of access to the collaborative object 700 that is less than the first level of access (e.g., it only permits access after the collaboration period has ended; or it permits access to the collaborative object 700 during the collaboration period, but not associated virtual content 704 until after the collaboration period has ended). In one example, the host receives an access level enabling access by default and the host may grant other users access rights by providing the access rights to the processor 499 of the sever system 498 via a physically remote device.

At block 1106, the processor maintains a table of access parameters. In an example, the processor maintains a table in cloud storage including an identifier for each of the users and their respective access levels based on access parameters supplied by the host. In the example where the host (user A; A_ID) invites another user (user B; B_ID) to collaborate on a project for yet another user (user C; C_ID), the processor may initially create a table including the information identified in TABLE 1 below:

TABLE 1

| USER | PERMISSION |
| --- | --- |
| A_ID | Yes |
| B_ID | No |
| C_ID | No |

In TABLE 1, a permission level of "Yes" indicates a first level of access and a permission level of "No" indicates a second level of access. As shown in TABLE 1, the host (A_ID) initially is the only user with access rights providing access to, for example, the virtual content 704 associated with the collaborative object 700 or the ability to add virtual content 704.

At block 1108, the processor maintains a timer. The processor may receive the timer value from the host. The timer may be used to track the time left during a collaboration period.

At block 1110, the processor provides access to collaborative object 700. The processor provide access to the collaborative object 700 by the users based on their respective access levels. In an example, when the user attempts to access the collaborative object 700, the processor will compare the user identification (ID) for the user to values in the table. If the user's ID (e.g., D_ID) is not found on the table, that user will not be able to access the collaborative object 700. If another user (e.g., C_ID) is found in the table, but has a "No" permission level, that user will only be provided with access commensurate with that level of access. If another user (e.g., A_ID) is found in the table with a "Yes" permission level, that user will be provided with access to the collaborative object 700 commensurate with that level of access.

At block 1112, the processor identifies an access level change. The processor identifies an access level change for at least one other of the users. In one example, the host grants another user (e.g., B_ID) access rights by sending an access rights change request to the processor 499 of the sever system 498 including the user ID to be changed and the new access level via a physically remote device. In another example, all users with a "Yes" permission level must request an access level change for a user with another permission level. The access level change is identified by the processor upon receipt of the request(s). In another example, the processor may identify a change based on the expiration of a collaboration period or a preset "reveal" time (e.g., based on a monitored timer). For example, where user A and user B are preparing content for user C, user A and user B may initially have a "Yes" permission level and the processor may automatically identify an access level change request for user C once the collaboration period has ended or the reveal time has been reached.

At block 1114, the processor changes the respective access level. The processor changes the respective access level of the at least one other of the users responsive to the access level change. In response to an identified access level change (e.g., changing B_ID permission level to "Yes," the processor updates the table as shown in TABLE 2 below:

TABLE 2

| USER | PERMISSION |
| --- | --- |
| A_ID | Yes |
| B_ID | Yes |
| C_ID | No |

Figure 12:
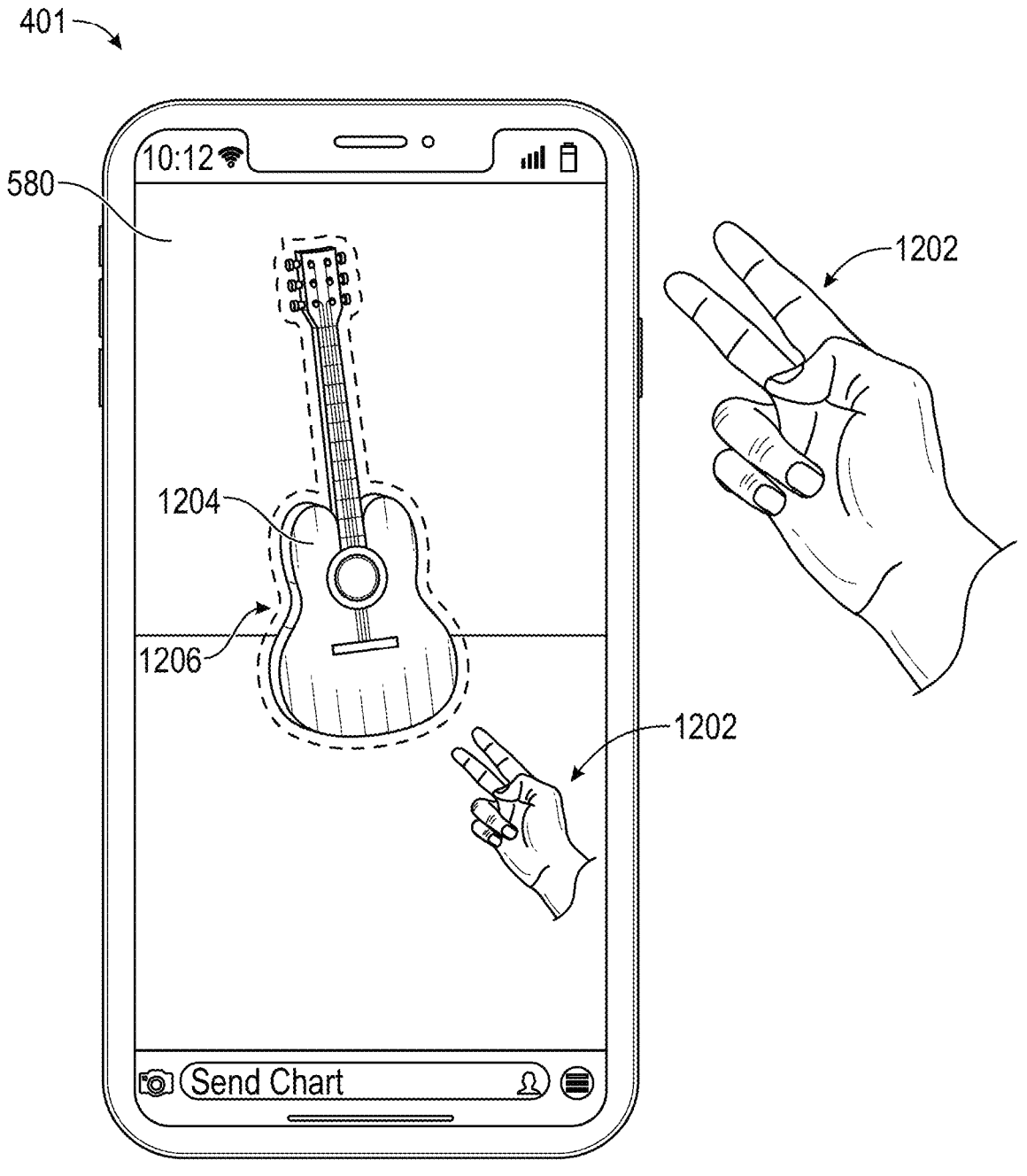
FIG. 12 is a perspective illustration of an example hand gesture associated with cropping media content for a collaborative object.

FIG. 12 is an example of the mobile device 401 used to capture an image segment 1204 using a hand gesture 1202. The processor 540 determines the hand gesture 1202 via the rear facing camera 570 of the mobile device 401. In an example, the hand gesture 1202 mimics a pair of scissors closing, such as cutting, and instructs the processor 540 to capture the image segment 1204 defined by a cutting gesture 1202 captured by the rear facing camera 570. The processor 540 tracks the hand gesture 1202 in relation to the display 580 and determines a path 1206 of the hand gesture 1202. The image segment 1204 within the path 1206 is identified by the processor 540 using image signal processing, and the image segment 1204 is saved to the memory 540A-C. The image segment 1204 is a cropped image of a displayed image congruent with the path 1206 taken by the hand gesture 1202.

The image on the display 580 that the image segment 1204 is taken from may be obtained using the rear view of the camera 570 or an uploaded image displayed on the display 580. In the case of the rear view, the displayed hand gesture 1202 is used as an indicator of the user segmenting the image, whereas in the case of an uploaded image, an indicator may be displayed, such a pair of scissors, to give the user reference of the hand gesture path 1206.

The image segment 1204 is obtained using the hand gesture 1202 to create virtual content 702 for association with the collaborative object 700. In one example, a guitar in an image is outlined using the hand gesture 1202 indicative of cutting scissors, and the image segment 1204 of the guitar is produced by the processor 540 of the mobile device 401. The image segment 1204 of the guitar is then associated by a user to the collaborative object 700. The example shown in FIG. 12 uses the mobile device 401, however, the same functionality may be implemented by using the electronic eyewear device 100.

Figure 13:
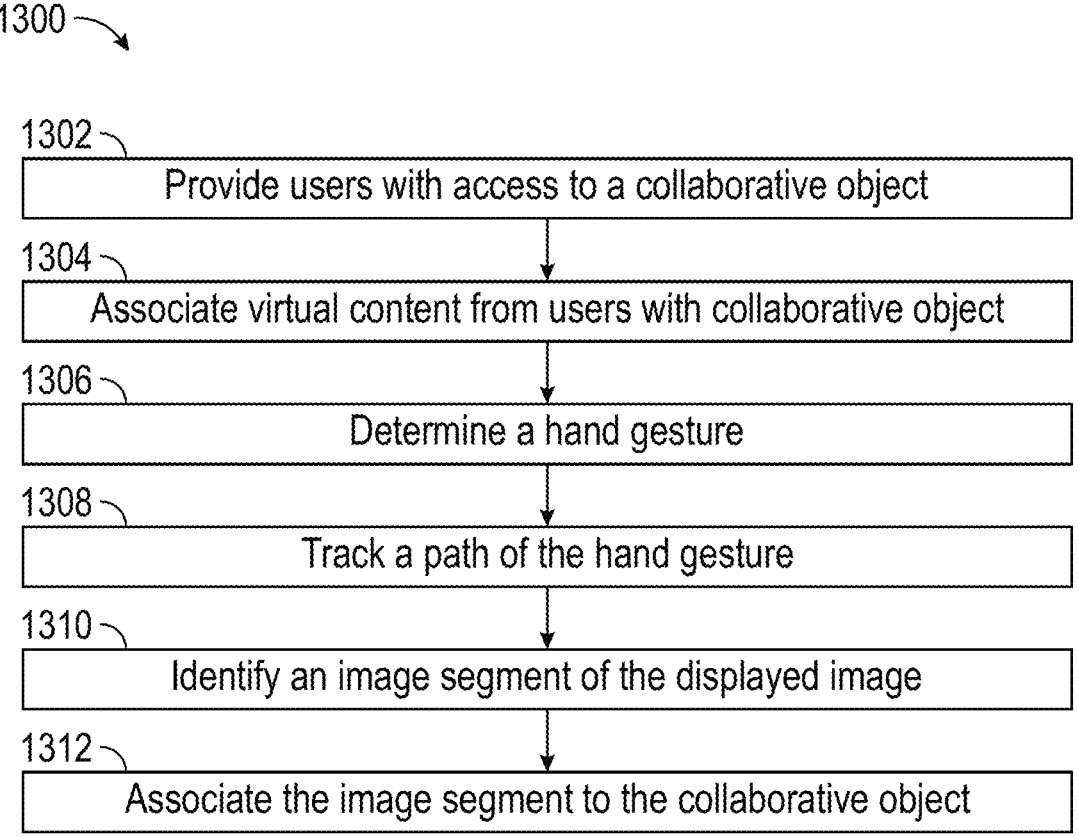
FIG. 13 is a flow chart listing the steps of an example media cropping method.

FIG. 13 is a flow chart 1300 including steps of a method for use in the collaboration application 925. A processor 499 of server system 498 enables users to associate the virtual content 702 with the collaborative object 700 via network 495. In one example, the steps of the flow chart 1300 are performed by one or multiple processors, such as processors 540, 432, and 499, distributed between the server system 499 and a physically remote device of a user, such as eyewear device 100 and mobile device 401.

At block 1302, the processor 499 provides the users with access to the collaborative object 700 during the session. This is shown in FIGS. 7-9. In an example, the users are provided authorization via network 495 to join the session and collaborate on the generation of the collaborative object 700. The processor 499 serves, via network 495, the collaborative object 700 to the physically remote devices, which present the collaborative object 700 to the user, e.g., as an overlay on the display 180A-B of the eyewear device 100 or the display 580 of the mobile device 401. In one example, users cannot access the associated virtual content 702 received from other users until the collaboration period ends. In another example, a subset of users can access the associated virtual content 702 added by others in that subset of users.

At block 1304, the processor 499 enables the users to associate the virtual content 702 with the collaborative object 700. An example of this is depicted in FIGS. 7-9. In an example, the users contribute to the joint collaboration by using their physically remote devices to add and modify virtual content 702 at chosen locations of the collaborative object 700, and shown in the display of their respective devices, such as on display 180A-B of the eyewear device 100 and display 580 of the mobile device 401.

At block 1306, the camera of the client device, such as cameras 114A-B of eyewear 100 camera 570 or mobile device 401, captures images and the processor determines a hand gesture 1202 of the user. In one example, the processor of the 540 of client device 540 or processor 432 of eyewear device 100 determines the hand gesture 1202. In another example, the processor 499 of the server system 498 obtains the images from the client device via network 495 and determines the hand gesture 1202. In one example, the captured hand gesture 1202 is compared to a table of gestures in memory to determine the meaning of the hand gesture 1202.

At block 1308, the path of the hand gesture 1202 is tracked using image signal processing, such as in relation to the image displayed on the client device display, such as the display 180A-B of the eyewear device 100 or the display 580 of the mobile device 401. Tracking is initiated once the hand gesture 1202 is identified by the processor. In one example, the processor 540 or the processor 432 of the client device tracks the hand gesture. In another example, the processor 499 for the server tracks the hand gesture using the images received from the client device via network 495.

At block 1310, the image segment 1204 traced by the hand gesture 1202 of the displayed image is identified. The processor identifies the image segment 1204 by determining an outline of the image segment 1204 from the path 1206 of the hand gesture 1202. A machine learning model may be utilized to efficiently identify object outlines and associate with the traced path 1206. In one example, the user uses the mobile device 401 to capture an image of a bedroom and display the image on the display 580. The user makes a scissor hand gesture 1202 in view of the camera 570 and traces a path 1206 around a guitar 1204, such as in reference to the displayed image. The processor 540 identifies the outlined object as the guitar 1204 using image signal processing, and crops the image segment of the guitar 1204 from the displayed image of the bedroom to and saves it to memory 540A-C. This process may be referred to as cloning since the resultant image segment replicates the look of the original object.

At block 1312, the processor 499 enables the users to associate the image segment 1204 with the collaborative object 700. The image segment 1204 is used as virtual content 702 as depicted in FIGS. 7-9. In an example, the guitar forming the image segment 704 is used as virtual content that is added to the collaborative object 700 that has a theme, such as a time capsule. Other image segments 1204 can be captured and added to the collaborative object 700. An audio segment may be associated with one or more of the image segments 1204, such as a music segment of a song associated with the guitar.

Machine learning refers to an algorithm that improves incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer vision, mathematical models attempt to emulate the tasks accomplished by the human visual system, with the goal of using computers to extract information from an image and achieve an accurate understanding of the contents of the image. Computer vision algorithms have been developed for a variety of fields, including artificial intelligence and autonomous navigation, to extract and analyze data in digital images and video.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds or thousands of nodes.

A convolutional neural network (CNN) is a type of neural network that is frequently applied to analyzing visual images, including digital photographs and video. The connectivity pattern between nodes in a CNN is typically modeled after the organization of the human visual cortex, which includes individual neurons arranged to respond to overlapping regions in a visual field. A neural network that is suitable for use in the determining process described herein is based on one of the following architectures: VGG16, VGG19, ResNet50, Inception V3, Xception, or other CNN-compatible architectures.

In the machine-learning example, at block 1008 and block 1012, the processor 432 determines whether a detected series of hand shapes substantially matches a predefined hand gesture using a machine-trained algorithm referred to as a hand feature model. The processor 432 is configured to access the hand feature model, trained through machine learning, and applies the hand feature model to identify and locate features of the hand shape in one or more frames of the video data.

In one example implementation, the trained hand feature model receives a frame of video data which contains a detected hand shape and abstracts the image in the frame into layers for analysis. Data in each layer is compared to hand gesture data stored in the hand gesture library 480, layer by layer, based on the trained hand feature model, until a good match is identified.

In one example, the layer-by-layer image analysis is executed using a convolutional neural network. In a first convolution layer, the CNN identifies learned features (e.g., hand landmarks, sets of joint coordinates, and the like). In a second convolution layer, the image is transformed into a plurality of images, in which the learned features are each accentuated in a respective sub-image. In a pooling layer, the sizes and resolution of the images and sub-images are reduced in order isolation portions of each image that include a possible feature of interest (e.g., a possible palm shape, a possible finger joint). The values and comparisons of images from the non-output layers are used to classify the image in the frame. Classification, as used herein, refers to the process of using a trained model to classify an image according to the detected hand shape. For example, an image may be classified as a "touching action" if the detected series of bimanual hand shapes matches the touching gesture stored in the library 480.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™ ANDROID™, WINDOWS® Phone, or another mobile operating system. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A mobile device having a camera and a processor configured to perform an interactive augmented reality method, the processor configured to:

receive access to a three-dimensional (3D) collaborative object, wherein the 3D collaborative object bas a theme, wherein the theme is a time capsule;

determine a hand gesture made by a single hand of a user of the mobile device using the camera;

track a path of the hand gesture within a real-world view of the camera that is displayed on the mobile device as a displayed image;

identify a 3D image segment of the real-world view in the displayed image within an outline corresponding to the path of the hand gesture;

crop the 3D image segment from the displayed image; and add the cropped 3D image segment to the 3D collaborative object to generate a modified 3D collaborative object such that the 3D cropped image segment appears to be contained in the 3D collaborative object.

2. The mobile device of claim 1, wherein the 3D collaborative object comprises a plurality of different 3D cropped images.

3. The mobile device of claim 1, wherein the mobile device comprises eyewear.

4. The mobile device of claim 1, wherein the mobile device is configured to add an audio segment to the 3D collaborative object.

5. The mobile device of claim 1, wherein the displayed image is a captured image of the camera of the mobile device and the displayed image shows the hand gesture as an indicator of the path.

6. An interactive augmented reality method performed by a processor of a mobile device having a camera, the method comprising:

receiving access to a three-dimensional (3D) collaborative object, wherein the 3D collaborative object has a theme, wherein the theme is a time capsule;

determining a hand gesture made by a single hand of a user of the mobile device using the camera;

tracking a path of the hand gesture within a real-world view of the camera that is displayed on the mobile device as a displayed image;

identifying a 3D image segment of the displayed image within an outline corresponding to the path of the hand gesture;

cropping the 3D image segment from the displayed image; and adding the 3D) cropped segment to the 3D collaborative object to generate a modified collaborative object such that the 3D cropped image segment appears to be contained in the 3D collaborative object.

7. The method of claim 6, wherein the 3D collaborative object comprises a plurality of different 3D cropped images.

8. The method of claim 6, wherein the mobile device comprises eyewear.

9. The method of claim 6, wherein the mobile device adds an audio segment to the 3D collaborative object.

10. The method of claim 6, wherein the displayed image is a captured image of the camera of the mobile device and the displayed image shows the hand gesture as an indicator of the path.

11. A non-transitory computer-readable medium storing program code that, when executed by an electronic processor of a mobile device, configures the electronic processor to:

receive access to a three-dimensional (3D) collaborative object, wherein the 3D collaborative object bas a theme, wherein the theme is a time capsule;

determine a hand gesture made by a single hand of a user of the mobile device using a camera;

track a path of the hand gesture within a real-world view of the camera that is displayed on the mobile device as a displayed image;

identifying a 3D image segment of the real-world view in the displayed image within an outline corresponding to the path of the hand gesture;

cropping the 3D image segment from the displayed image; and adding the 3D cropped segment to the 3D collaborative object to generate a modified 3D collaborative object such that the 3D cropped image segment appears to be contained in the 3D collaborative object.

12. The non-transitory computer-readable medium of claim 11, wherein the 3D collaborative object comprises a plurality of different 3D cropped images.

13. The non-transitory computer-readable medium of claim 11 storing program code that, when executed by the electronic processor, adds an audio segment to the 3D collaborative object.

* * * * *